(12) United States Patent
Buck et al.

(10) Patent No.: US 9,231,393 B2
(45) Date of Patent: Jan. 5, 2016

(54) ELECTRICAL ASSEMBLY WITH ORGANIZER

(71) Applicants: Jonathan E. Buck, Hershey, PA (US); Charles M. Gross, York, PA (US)

(72) Inventors: Jonathan E. Buck, Hershey, PA (US); Charles M. Gross, York, PA (US)

(73) Assignee: FCI AMERICAS TECHNOLOGY LLC, Carson City, NV (US)

( * ) Notice: Subject to any disclaimer, the term of this patent is extended or adjusted under 35 U.S.C. 154(b) by 0 days.

(21) Appl. No.: 13/795,645

(22) Filed: Mar. 12, 2013

(65) Prior Publication Data

US 2013/0270000 A1    Oct. 17, 2013

Related U.S. Application Data

(60) Provisional application No. 61/623,955, filed on Apr. 13, 2012.

(51) Int. Cl.
*H01R 3/00* (2006.01)
*H02G 7/00* (2006.01)
*H02G 1/14* (2006.01)
(Continued)

(52) U.S. Cl.
CPC ............. *H02G 7/00* (2013.01); *G09B 19/00* (2013.01); *H01R 12/53* (2013.01); *H02G 1/14* (2013.01); *H01R 4/028* (2013.01); *H01R 43/0249* (2013.01); *Y10T 29/49195* (2015.01)

(58) Field of Classification Search
CPC ..................................................... H01R 23/662
USPC .................... 439/876, 874, 493, 497
See application file for complete search history.

(56) References Cited

U.S. PATENT DOCUMENTS

| 5,035,631 A | 7/1991 | Piorunneck et al. |
| 5,085,596 A | 2/1992 | Bowen et al. |

(Continued)

FOREIGN PATENT DOCUMENTS

| JP | 2002/170640 | 6/2002 |
| JP | 2011/028903 | 2/2011 |

(Continued)

OTHER PUBLICATIONS

U.S. Appl. No. 61/624,238, filed Apr. 13, 2012, Stoner.

(Continued)

*Primary Examiner* — Phuong Dinh
(74) *Attorney, Agent, or Firm* — Baker & Hostetler LLP

(57) ABSTRACT

Electrical assemblies including various complementary electrical components and plurality of cables are provided. Components of the electrical assemblies are configured such that respective signal conductor ends of the plurality of electrical cables can be isolated from one another and placed in electrical communication with the complementary electrical components using a conductive material. In accordance with some embodiments, the electrical assemblies include organizers that define respective pluralities of cavities and are configured to be attached to the complementary electrical components. In accordance with another embodiment, a lead-frame assembly can define a plurality of cavities. The cavities of each of the pluralities of cavities are isolated from each other such that respective signal conductor ends of the plurality of electrical cables can be inserted into respective ones of the pluralities of cavities and placed into electrical communication with the respective complementary electrical components by filling the cavities with conductive material.

33 Claims, 18 Drawing Sheets

(51) Int. Cl.
    *G09B 19/00*    (2006.01)
    *H01R 12/53*    (2011.01)
    *H01R 4/02*     (2006.01)
    *H01R 43/02*    (2006.01)

(56) References Cited

U.S. PATENT DOCUMENTS

| | | | |
|---|---|---|---|
| 5,122,065 | A | 6/1992 | Dudek et al. |
| 5,658,170 | A * | 8/1997 | Tan et al. ............... 439/607.41 |
| 5,770,818 | A | 6/1998 | Tanaka et al. |
| 5,944,536 | A | 8/1999 | Seong et al. |
| 5,953,815 | A * | 9/1999 | Kaminski et al. ............. 29/860 |
| 5,980,321 | A | 11/1999 | Cohen et al. |
| 6,139,372 | A * | 10/2000 | Yang ............................ 439/701 |
| 6,575,772 | B1 | 6/2003 | Soubh et al. |
| 6,726,492 | B1 | 4/2004 | Yu |
| 6,726,503 | B2 * | 4/2004 | Waddell et al. ............... 439/465 |
| 6,802,744 | B2 * | 10/2004 | Chiang ......................... 439/701 |
| 6,893,272 | B2 | 5/2005 | Yu |
| 7,168,960 | B1 | 1/2007 | Ju |
| 7,364,474 | B2 | 4/2008 | DeLessert et al. |
| 7,435,132 | B1 | 10/2008 | Fong et al. |
| 7,497,736 | B2 | 3/2009 | Minich et al. |
| 7,510,425 | B2 * | 3/2009 | Kuo et al. ..................... 439/493 |
| 8,231,415 | B2 | 7/2012 | Johnescu et al. |
| 8,366,485 | B2 | 2/2013 | Johnescu et al. |
| 8,440,910 | B2 | 5/2013 | Nonen et al. |
| 2003/0040203 | A1 | 2/2003 | Kuroda et al. |
| 2003/0176085 | A1 | 9/2003 | Laker |
| 2005/0095902 | A1 | 5/2005 | Zhang et al. |
| 2007/0232127 | A1 | 10/2007 | Lin |
| 2008/0318478 | A1 | 12/2008 | Nelson et al. |
| 2010/0075537 | A1 | 3/2010 | McIntire et al. |
| 2011/0195593 | A1 | 8/2011 | McGrath et al. |
| 2013/0188325 | A1 | 7/2013 | Garman et al. |
| 2014/0191457 | A1 | 7/2014 | Sharma et al. |

FOREIGN PATENT DOCUMENTS

| | | |
|---|---|---|
| KR | 10-1998-0033360 | 7/1998 |
| KR | 20-2009-0011286 | 11/2009 |
| WO | WO 2012/072968 | 6/2012 |

OTHER PUBLICATIONS

International Patent Application No. PCT/US2013/035084: International Search Report dated Jul. 23, 2013, 15 pages.

* cited by examiner

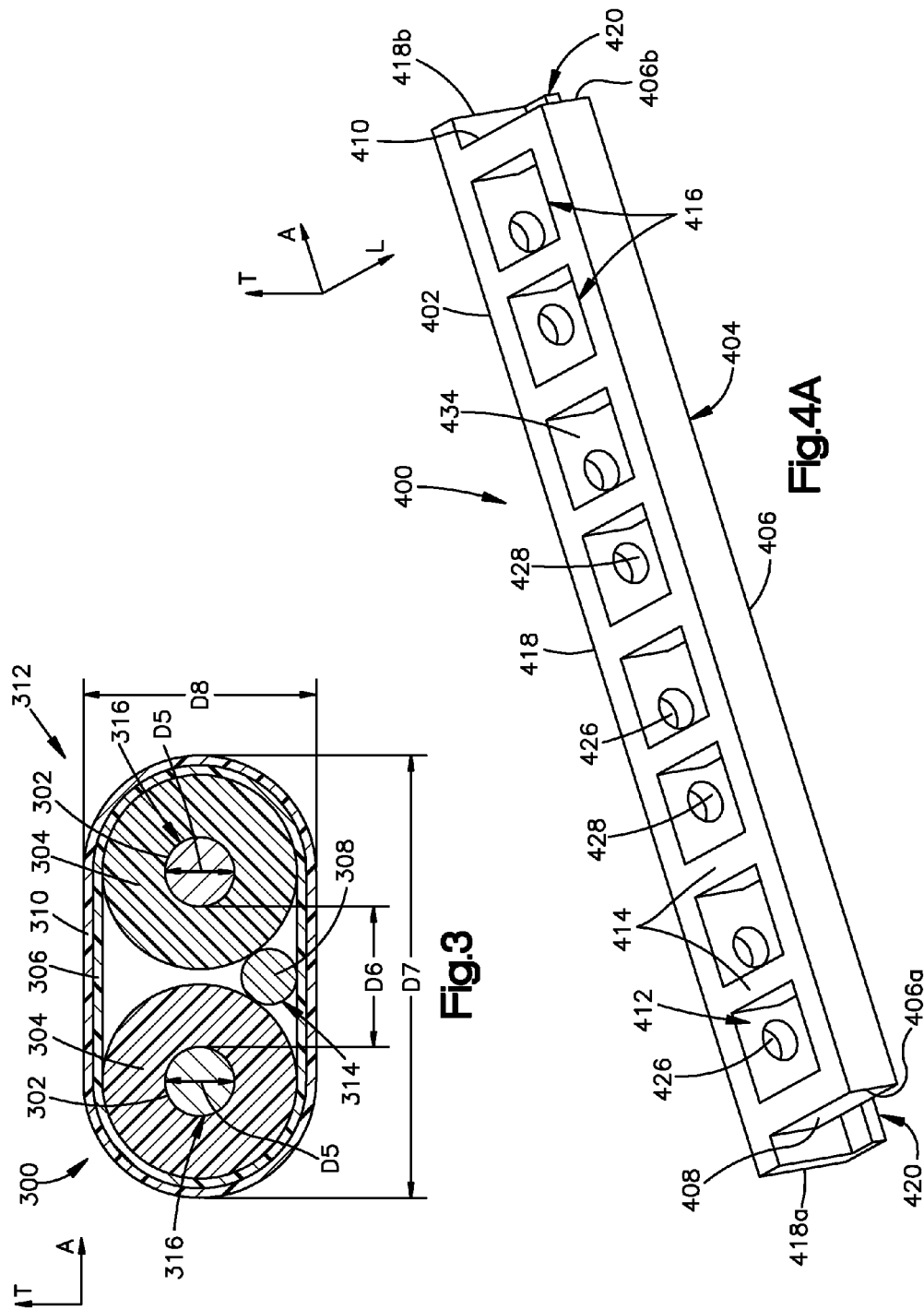

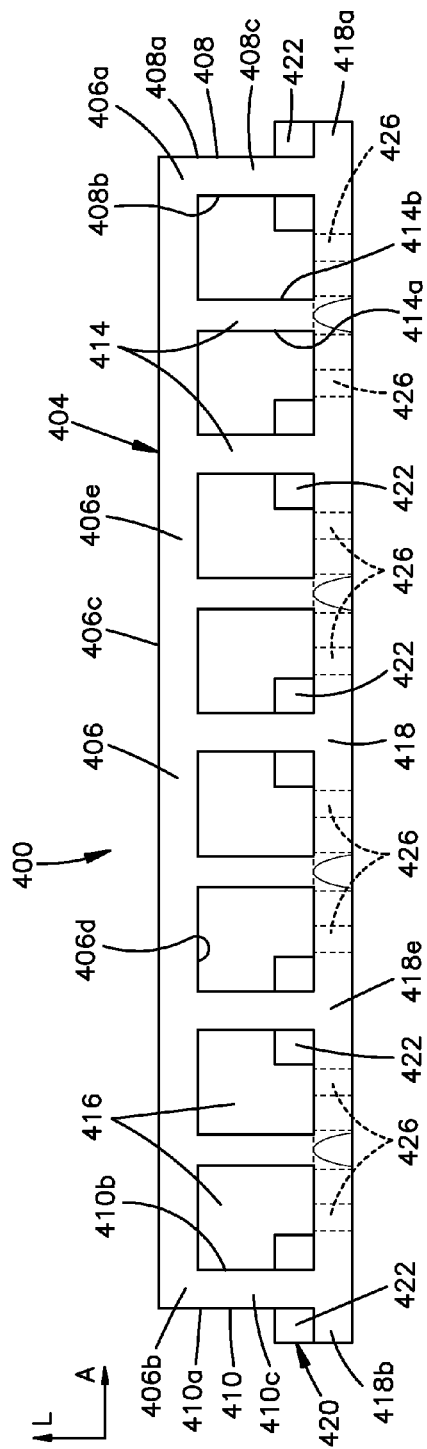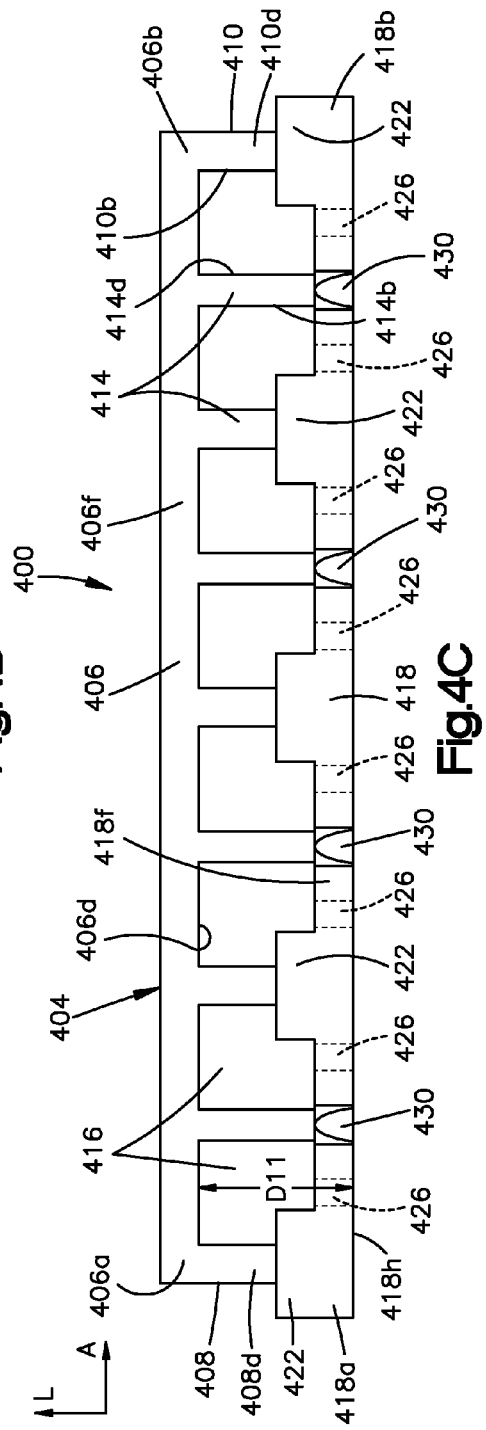

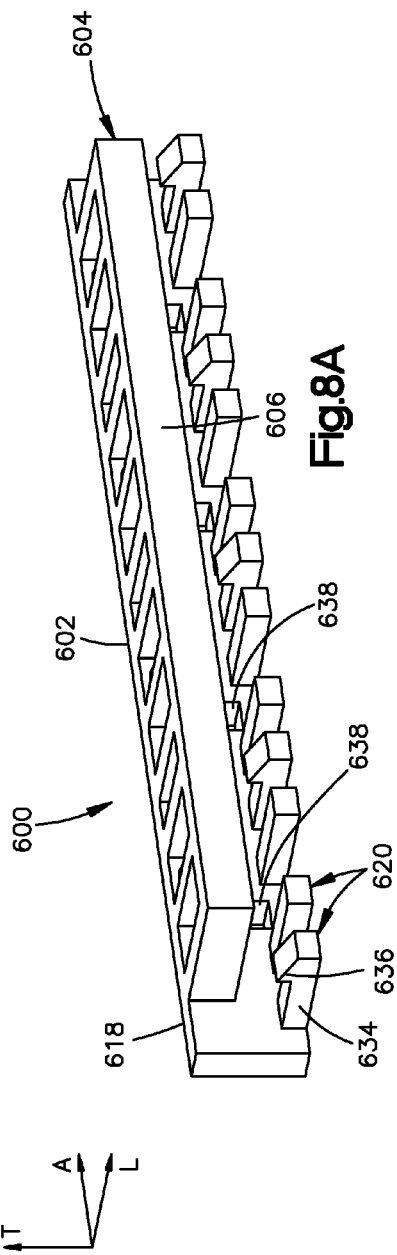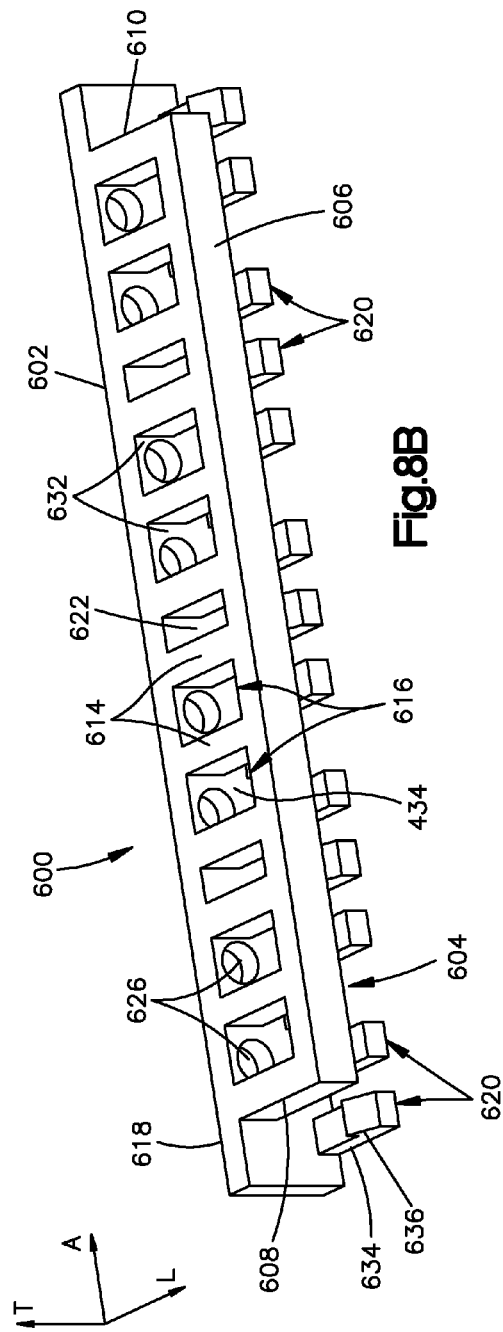

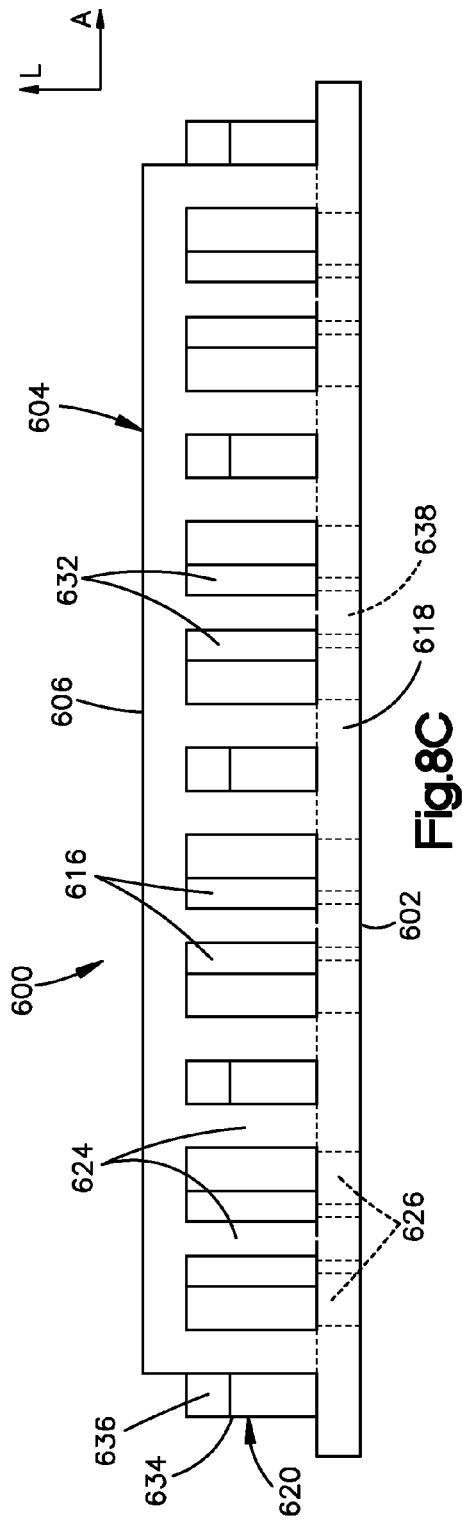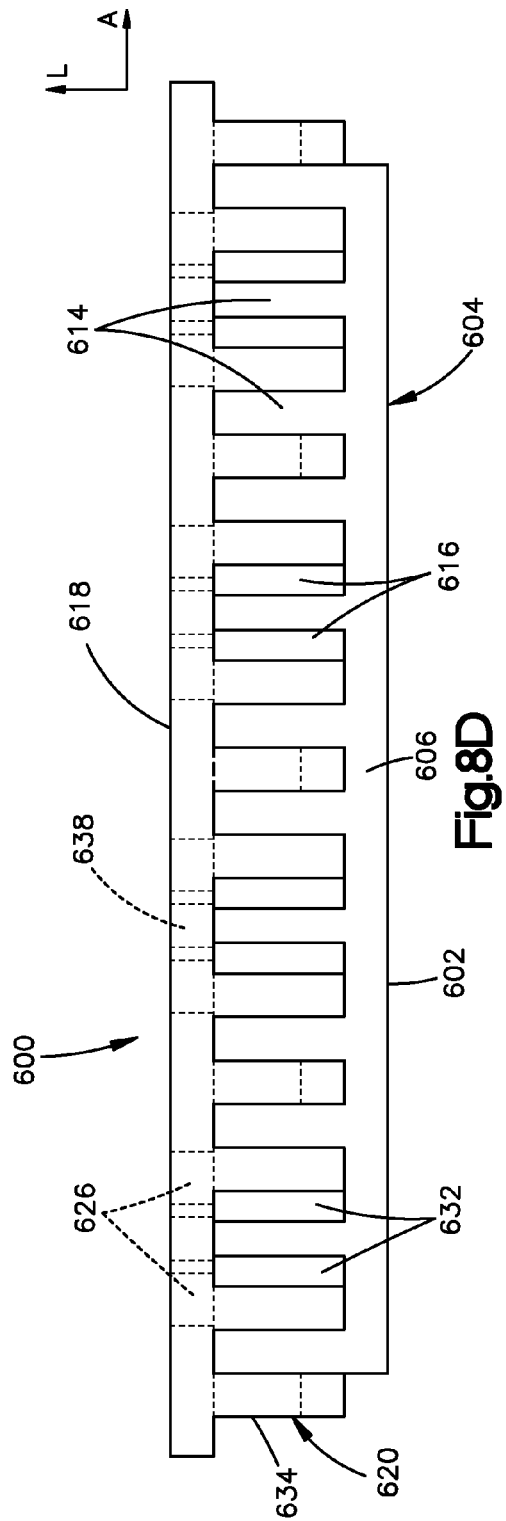

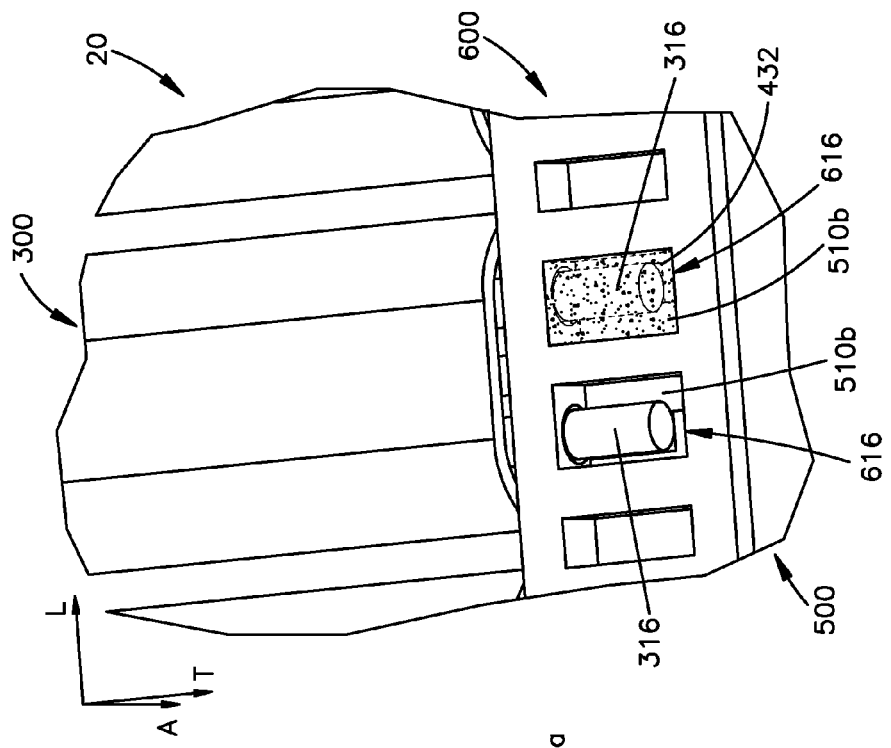
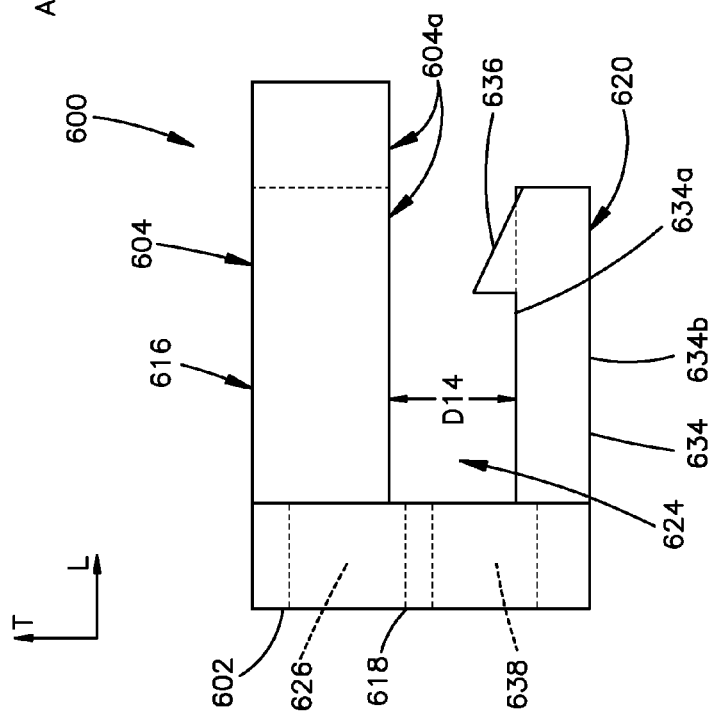
Fig.8E
Fig.9

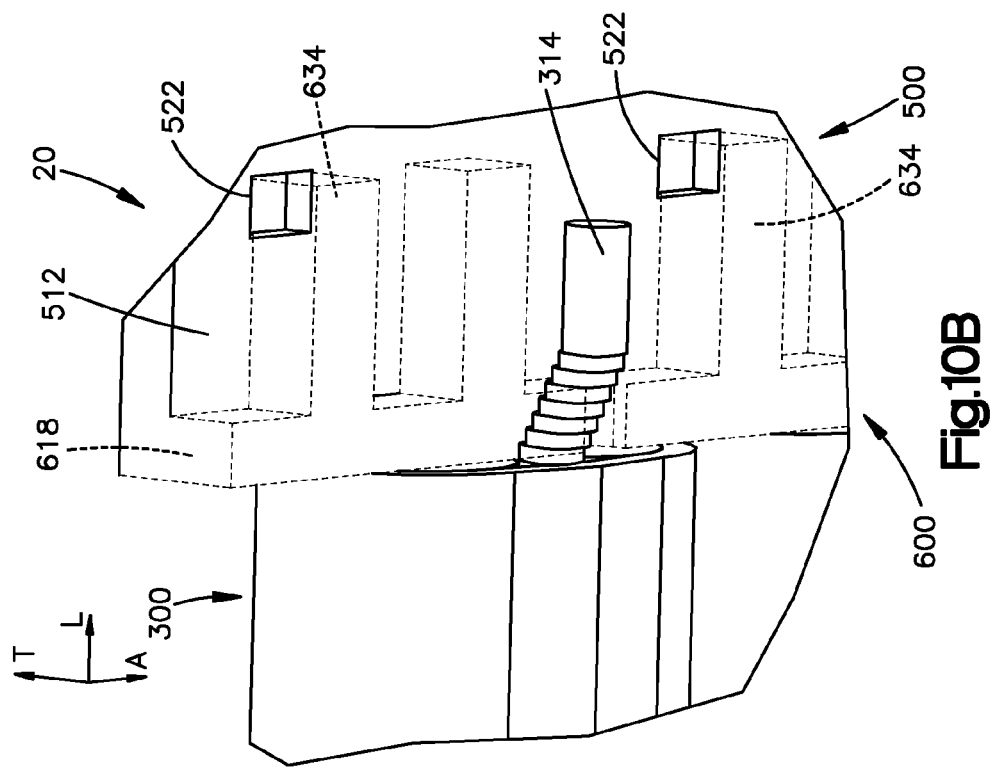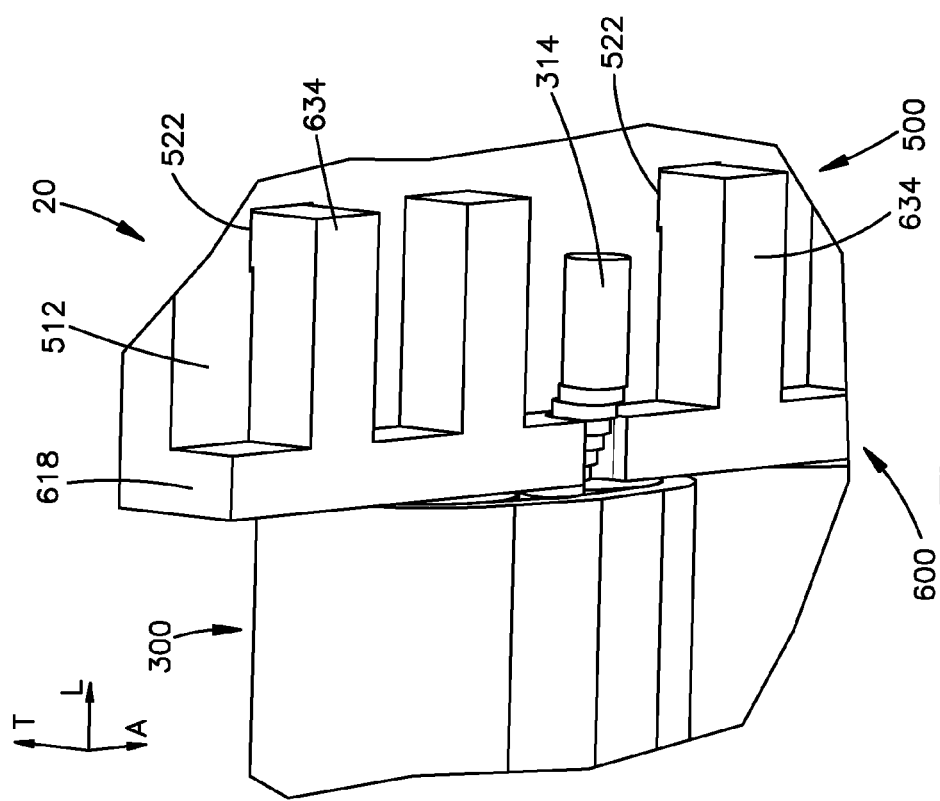

ELECTRICAL ASSEMBLY WITH ORGANIZER

CROSS-REFERENCE TO RELATED APPLICATIONS

This application claims the benefit of U.S. Provisional Application No. 61/623,955 filed Apr. 13, 2012, the contents of which are hereby incorporated by reference herein in its entirety.

BACKGROUND

Electrical assemblies, such as electrical connectors, can include conductor carrying cables that can be configured to be placed into electrical communication with a complementary electrical component, such as an underlying substrate in the form of a printed circuit board. For example, respective conductor ends of a plurality of cables can be mounted to respective contact pads of a printed circuit board. A typical method of mounting cable conductor ends to the contact pads of a printed circuit board is to align the cable conductor ends such that they abut respective ones of the contact pads and to solder the cable conductor ends to the respective contact pads, for instance using a solder reflow process. However, during a typical solder reflow process, solder from a joint between a particular conductor end and a corresponding first contact pad can flow onto an adjacent second contact pad, thereby creating an undesirable short circuit between the first and second contact pads and the cable conductors mounted to them.

SUMMARY

In accordance with one embodiment, an organizer includes an organizer body configured to be attached to a complementary electrical component. The organizer body defines a plurality of cavities. Each of the plurality of cavities is configured to at least partially receive a conductor end of a respective one of a plurality of cables. The organizer further includes at least one retention member supported by the organizer body. The at least one retention member is configured to retain the organizer in an attached position relative to the complementary electrical component. When the organizer is attached to the complementary electrical component the plurality of cavities are isolated from each other by cooperation of the organizer body and the complementary electrical component such that a first conductor end of a respective one of the plurality of cables disposed in a first cavity of the plurality of cavities is isolated from a second conductor end of a respective one of the plurality of cables disposed in a second cavity of the plurality of cavities.

In accordance with another embodiment, an electrical assembly includes a leadframe housing configured to be supported by an electrical connector. The leadframe housing has a housing body that defines a mounting end and an opposed mating end that is spaced from the mounting end along a mating direction. The housing body defines a plurality of cavities that extend into the housing body. The cavities of the plurality of cavities are configured to isolate respective conductor ends of a plurality of cables. The electrical assembly further includes a plurality of electrical contacts supported by the leadframe housing. Each of the plurality of electrical contacts has a contact body that defines a mounting end and an opposed mating end.

In accordance with still another embodiment, a method of electrically connecting a plurality of cables to a substrate, each cable including a conductor end, includes the step of attaching an organizer to the substrate. The organizer has an organizer body that defines a plurality of cavities. Each of the plurality of cavities is sized to receive the conductor end of a respective one of the plurality of cables. The method further includes the step of disposing the conductor end of each of the plurality of cables into a respective one of the plurality of cavities. The method further includes the step of at least partially filling each of the plurality of cavities with a conductive material. The conductive material facilitates electrical communication between the conductor end of each of the plurality of cables and the substrate.

BRIEF DESCRIPTION OF THE DRAWINGS

The foregoing summary, as well as the following detailed description of an example embodiment of the application, will be better understood when read in conjunction with the appended drawings, in which there is shown in the drawings example embodiments for the purposes of illustration. It should be understood, however, that the application is not limited to the precise arrangements and instrumentalities shown. In the drawings:

FIG. 3 is a section end view of one of the plurality of cables illustrated in FIG. 1A;

FIG. 4A is a perspective view of the organizer illustrated in FIGS. 1A-1B;

FIG. 4B is a top elevation view of the organizer illustrated in FIGS. 1A-1B;

FIG. 4C is a bottom elevation view of the organizer illustrated in FIGS. 1A-1B;

FIGS. 8A-8B are perspective views of the organizer illustrated in FIG. 6

FIG. 8C is a top elevation view of the organizer illustrated in FIG. 6;

FIG. 8D is a bottom elevation view of the organizer illustrated in FIG. 6;

FIG. 8E is a side elevation view of the organizer illustrated in FIG. 6;

FIG. 9 is zoomed perspective view of a portion of the electrical assembly illustrated in FIG. 6;

FIG. 10A is a zoomed perspective view of a portion of the underside of the electrical assembly illustrated in FIG. 6;

FIG. 10B is a perspective view of the portion of the underside of the electrical assembly illustrated in FIG. 10A with the organizer depicted as transparent to review detail of the cables and the leadframe assembly;

DETAILED DESCRIPTION

Figure 1A:
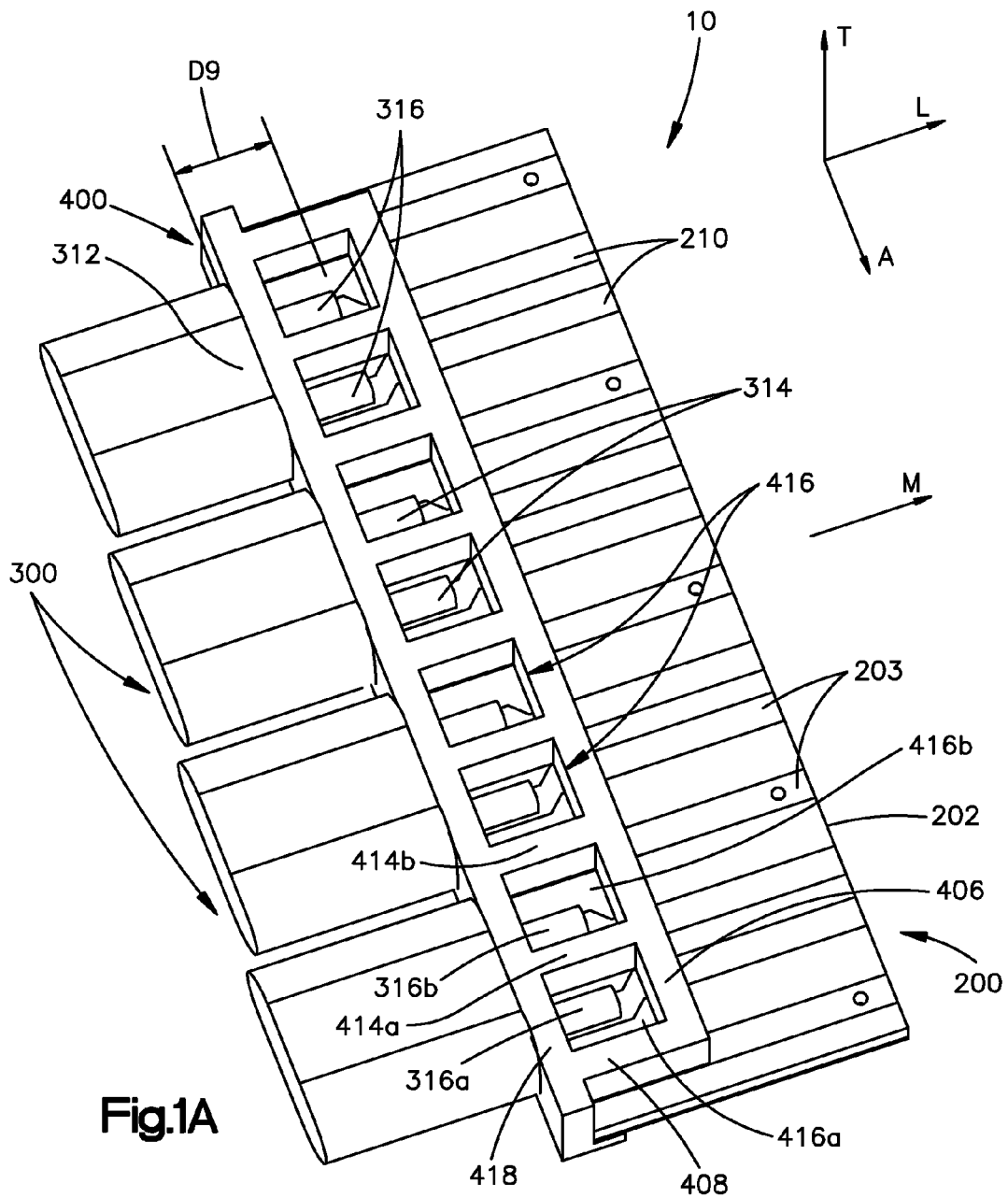
FIG. 1A is a perspective view of an electrical assembly in accordance with one embodiment, the electrical assembly including a printed circuit board, a plurality of cables mounted to the printed circuit board, and an organizer mounted to the printed circuit board and configured to isolate respective portions of one or both of the printed circuit board and the cables.
Figure 1B:
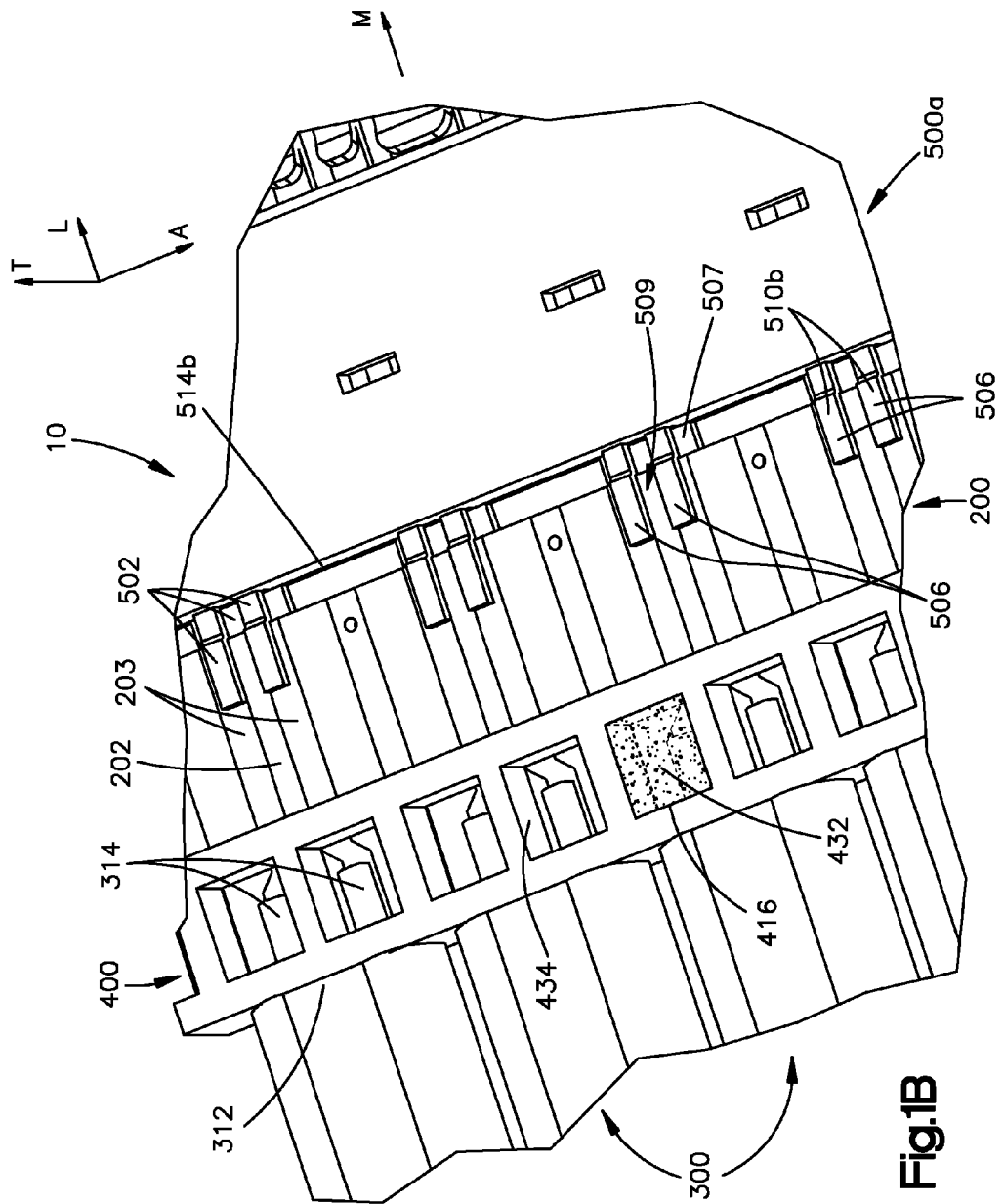
FIG. 1B is a perspective view of the electrical assembly illustrated in FIG. 1A, the electrical assembly further including a leadframe assembly that is mated to the printed circuit board.

Referring initially to FIGS. 1A-1B, an electrical assembly 10 includes at least one such as a plurality of cables 300 and at least one complementary electrical component, for instance a substrate 200, such as a printed circuit board 202. The plurality of cables 300 can be configured to be mounted to the substrate 200 so as to be placed in electrical communication with the substrate 200. For example, the printed circuit board 202 can include a plurality of electrically conductive elements 203 supported by the printed circuit board 202. The plurality of cables 300 can be placed in electrical communication with the printed circuit board 202 by mounting each of the plurality of cables 300 to a respective one of the plurality of electrically conductive elements 203.

The electrical assembly 10 can further include at least one organizer 400 that is configured be attached to the substrate 200, such that the organizer 400 acts to isolate respective portions of one or both of the substrate 200 and the plurality of cables 300 when the organizer 400 is attached to the substrate 200. The electrical assembly 10 can further include a second complementary electrical component, such as a leadframe assembly 500a supporting a plurality of complementary electrical conductors, such as a plurality of electrical contacts 502. The leadframe assembly 500a can be configured to be mated to the printed circuit board 202 so as to place the leadframe assembly 500a in electrical communication with the printed circuit board 202, and thus with the plurality of cables 300, for example by mating the plurality of electrical contacts 502 supported by the leadframe assembly 500a to respective ones of the plurality of electrically conductive elements 203 supported by the printed circuit board.

Figure 2:
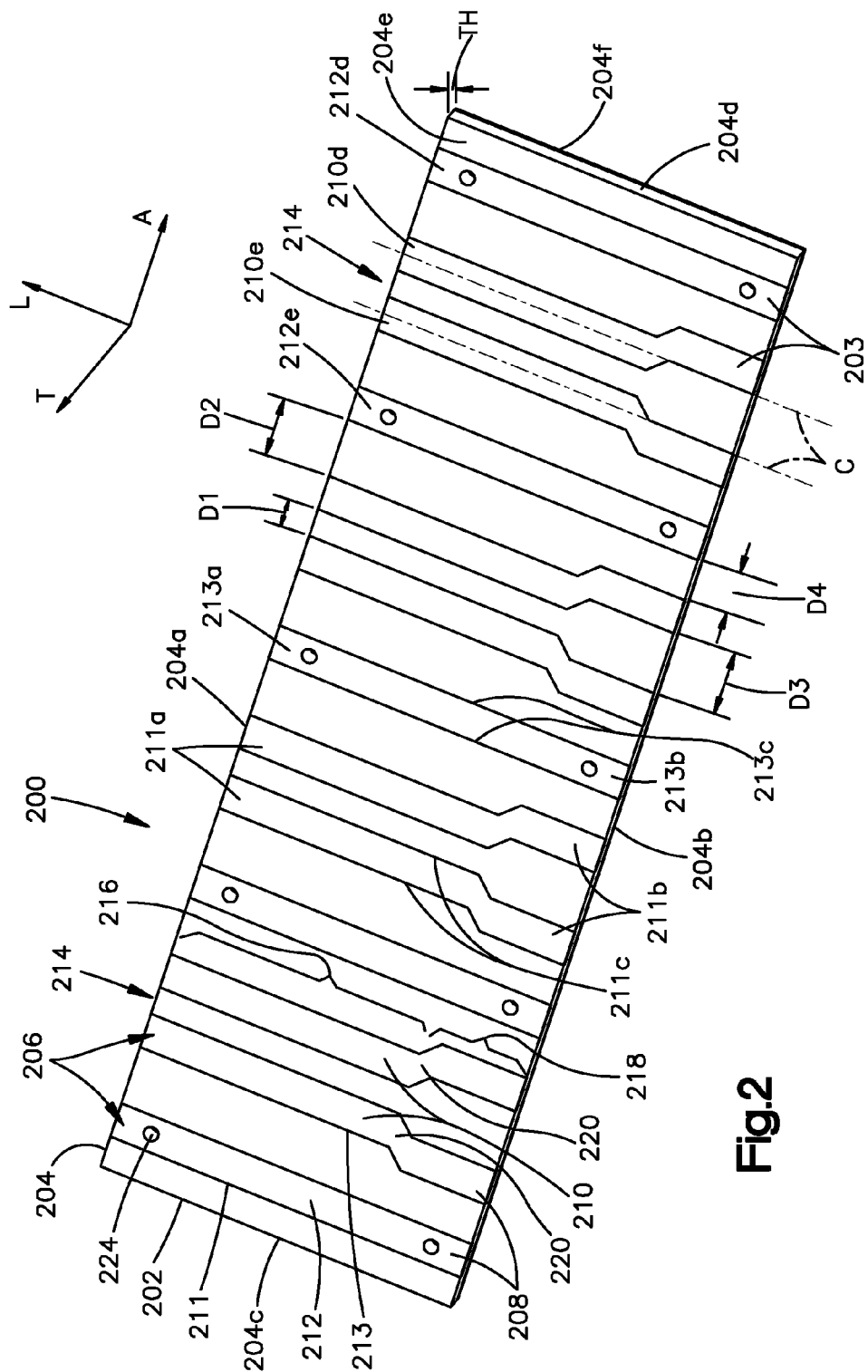
FIG. 2 is a perspective view of the printed circuit board illustrated in FIG. 1A.
Figure 4D:
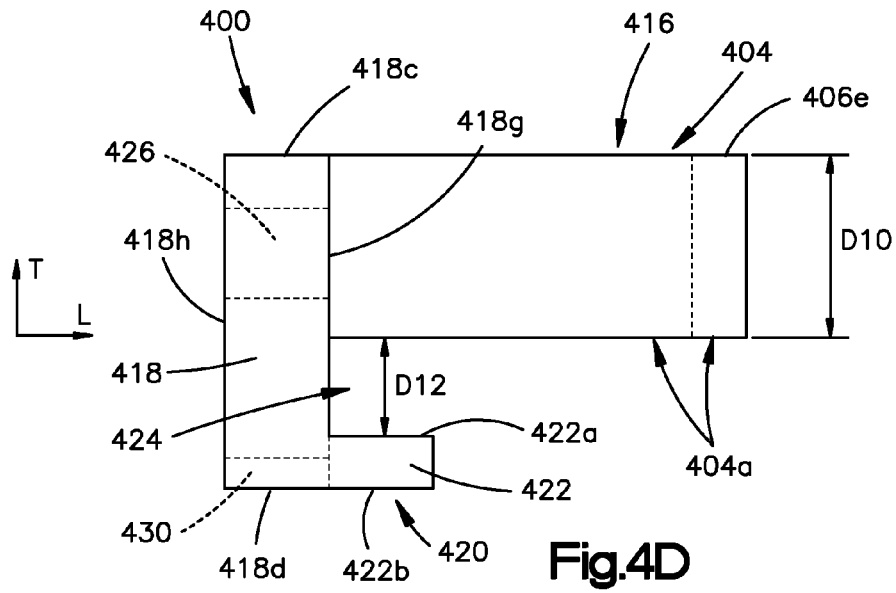
FIG. 4D is a side elevation view of the organizer illustrated in FIGS. 1A-1B.

Referring now to FIG. 2, the substrate 200, such as the printed circuit board 202, can include an electrically insulative housing, such as substrate body 204, that defines a first side 204c that is spaced from an opposed second side 204d along a first or lateral direction A, a first end that can define a front end 204a, an opposed second end that can define a rear end 204b, the rear end 204b spaced from the front end 204a along a second or longitudinal direction L that extends substantially perpendicular to the lateral direction A, a first outer surface that can define an upper surface 204e, and an opposed second outer surface that can define a lower surface 204f, the lower surface 204f spaced from the upper surface 204e along a third or transverse direction T that extends substantially perpendicular to both the longitudinal direction L and the lateral direction A. The substrate body 204 can have a thickness TH along the transverse direction T, for instance as defined by the upper and lower surfaces 204e and 204f. In accordance with the illustrated embodiment, the substrate body 204 is oriented such that the transverse direction T is oriented vertically and the longitudinal and lateral directions L and A, respectively, are oriented horizontally, though it should be appreciated that the orientation of the substrate body 204, and of the electrical assembly 10, can differ during use. Unless otherwise specified herein, the terms "lateral," "laterally," "longitudinal," "longitudinally," "transverse," and "transversely" are used to designate perpendicular directional components in the drawings to which reference is made.

The printed circuit board 202 can further include at least one such as a plurality of electrical conductors, such as electrically conductive elements 203 that can be supported by the printed circuit board 202, for instance by the substrate body 204. In an alternative embodiment, electrical conductors may also include to electrical contacts in addition to, or in place of, electrically conductive elements 203. The electrically conductive elements 203 can be electrically connected to electrically conductive traces that are routed through the substrate body 204 or along one or more surfaces of the substrate body 204, such as along one or both of the upper and lower surfaces 204e and 204f thereof, in any combination as desired. In accordance with illustrated embodiment, the printed circuit board 202 includes a plurality of electrically conductive elements 203 in the form of a plurality of electrical contact pads 206 arranged along the upper surface 204e of the substrate body 204. The plurality of electrical contact pads 206 can include a plurality of contact strips 208 that are disposed along, and can be affixed to, the upper surface 204e. The contact strips 208 can be made of any suitable conductive material, such as metal. The plurality of contact strips 208 can include one or both of signal contact strips 210 or ground contact strips 212. In accordance with the illustrated embodiment, the upper surface 204e includes respective pluralities of signal contact strips 210 and ground contact strips 212.

At least one such as each of the plurality of signal contact strips 210 can include respective a signal strip body 211 that defines a front end 211a, an opposed rear end 211b that is spaced from the front end 211a along the longitudinal direction L, and first and second opposed sides 211c that are spaced apart from each other along the lateral direction A. The front end 211a can be disposed substantially at the front end 204a of the substrate body 204 and the rear end 211b can be disposed substantially at the rear end 204b of the substrate body 204, such that the signal strip body 211 of each signal contact strip 210 extends from the front end 204a to the rear end 204b of the substrate body 204 along the longitudinal direction L. Furthermore, at least one such as each of the plurality of ground contact strips 212 can include a ground strip body 213 that defines a front end 213a, an opposed rear end 213b that is spaced from the front end 213a along the longitudinal direction L, and first and second opposed sides 213c that are spaced apart from each other along the lateral direction A. The front end 213a can be disposed substantially at the front end 204a of the substrate body 204 and the rear end 213b can be disposed substantially at the rear end 204b of the substrate body 204, such that the ground strip body 213 extends from the front end 204a to the rear end 204b of the substrate body 204 along the longitudinal direction L.

The electrically conductive elements 203, such as the respective pluralities of signal contact strips 210 and ground contact strips 212, can be disposed along the upper surface 204e in any suitable arrangement as desired. For instance, the plurality of signal contact strips 210 and the plurality of ground contact strips 212, respectively, can be disposed along the upper surface 204e in an alternating pattern, the signal contact strips 210 and ground contact strips 212 spaced apart from each other along the lateral direction A. In accordance with the illustrated embodiment, the substrate 200 includes a plurality of ground contact strips 212 that are laterally spaced from each other along the upper surface 204e and a plurality of signal contact strips 210 that are laterally spaced from each other along the upper surface 204e. The signal contact strips 210 of the plurality are arranged in pairs 214 of signal contract strips 210. The signal contact strips 210 of each pair 214 are laterally spaced from each other along the upper surface 204e. The pairs 214 of signal contact strips 210 can be laterally spaced from each other along the upper surface 204e such that each pair 214 of signal contact strips 210 is disposed between each ground contact strip 212 and a respective consecutive ground contact strip 212.

More specifically, each pair 214 of signal contact strips 210 can include a first signal contact strip 210d and a second contact strip 210e that is spaced from the first signal contact strip 210d along the lateral direction A. Each pair 214 of signal contact strips 210 can be disposed between a first ground contact strip 212d and a second ground contact strip 212e that is spaced from the first ground contact strip 212d along the lateral direction A. Additionally, each pair 214 of signal contact strips 210 can be disposed between the first and second ground contact strips 212d and 212e such that the first signal contact strip 210d is disposed adjacent the first ground contact strip 212d and the second signal contact strip 210e is disposed adjacent the second ground contact strip 212e.

The first and second signal contact strips 210d and 210e of each pair 214 can be spaced apart from each other a distance D1 along the lateral direction A, the distance D1 defined by respective sides 211c of the signal strip bodies 211 of the first and second signal contact strips 210d and 210e that face one another. Each of the first and second signal contact strips 210d and 210e of each pair 214 can be spaced from a respective adjacent ground contact strip 212 a distance D2, the distance D2 defined by respective sides 211c and 213c of the signal strip body 211 and the corresponding ground strip body 213, respectively, that face one another. In accordance with the illustrated embodiment, the distance D2 is longer than the distance D1.

The above-described arrangement of a pair 214 of signal contact strips 210 disposed between respective consecutive ground contact strips 212 can be repeated along the upper surface 204e. For example, the second ground contact strip 212e can be disposed adjacent both a first pair 214a of signal contact strips 210 and a second pair 214b of signal contact strips 210. Stated differently, the second ground contact strip 212e can be both the second ground contact strip 212e associated with the first pair 214a of signal contact strips 210 and the first ground contact strip 212d associated with the second pair 214b of signal contact strips 210, the first and second pairs 214a and 214b of signal contact strips 210 spaced from each other along the lateral direction A.

In accordance with the illustrated embodiment, the plurality of signal contact strips 210 comprises four pairs 214 of signal contact strips 210 and the plurality of ground contact strips 212 comprises five ground contact strips 212, the pluralities of signal contact strips 210 and ground contact strips disposed along the upper surface 204e in accordance with the above-described repeated arrangement. Stated differently, the pluralities of signal contact strips 210 and ground contact strips 212 can be arranged along the upper surface 204e in a repeating ground-signal-signal pattern, from right to left along the lateral direction A. It should be appreciated that the printed circuit board 202 is not limited to the illustrated number of signal contact strips 210 and ground contact strips 212. For instance, the printed circuit board 202 can be alternatively constructed with more or fewer of one or both of signal contact strips 210 and ground contact strips 212 disposed along the upper surface 204e in accordance with any suitable arrangement as desired.

The signal strip body 211 of each of the plurality of signal contact strips 210 can extend along a respective centreline C that extends substantially parallel to the longitudinal direction L. At least a portion of the signal strip body 211 of at least one such as each of the plurality of signal contact strips 210 can be offset relative to the respective centreline C. For example, the signal strip body 211 of at least one such as each of the plurality of signal contact strips 210 can define a first or remainder portion 216 and a second or offset portion 218 that is laterally offset with respect to the remainder portion 216 and offset with respect to the respective centerline C of the signal strip body 211. The signal strip body 211 of each signal contact strip 210 can define an intermediate location 220 between the front and rear ends 211a and 211b, respectively, such that the remainder portion 216 transitions into the offset portion 218 substantially at the intermediate location 220. In accordance with the illustrated embodiment, the remainder portion 216 of each signal strip body 211 extends rearward from the front end 211a and away from the front end 204a of the substrate body 204, and the offset portion 218 extends forward from the rear end 211b and away from the rear end 204b of the substrate body 204. Furthermore, the intermediate location 220 is located closer to the rear end 211b than the front end 211a, such that the remainder portion 216 defines a length along the longitudinal direction L that is longer than the length along the longitudinal direction L of the offset portion 218.

The respective offset portions 218 of each of the first and second signal contact strips 210d and 210e of each pair 214 can be constructed such that the rear ends 211b of the signal strip bodies 211 of the first and second signal contact strips 210d and 210e are spaced further apart from each other than the front ends 211a. Stated differently, the first and second signal contact strips 210d and 210e of each pair 214 can be constructed such that the offset portion 218 of the first and second signal contact strips 210d and 210e are spaced closer to the corresponding adjacent ground contact strip 212 than the remainder portions 216. For example, in accordance with the illustrated embodiment, the front ends 211a of the first and second signal contact strips 210d and 210e of each pair 214 can be spaced apart from each other the distance D1, and the rear ends 211b of the first and second signal contact strips 210d and 210e of each pair 214 can be spaced apart from each other a distance D3 that is longer than the distance D1. The front ends 211a of the first and second signal contact strips 210d and 210e of each pair 214 can be spaced from a respective adjacent ground contact strip 212 the distance D2, and the rear ends 211b of the first and second signal contact strips 210d and 210e of each pair 214 can be spaced from a respective adjacent ground contact strip 212 a distance D4 that is shorter than the distance D2.

In accordance with illustrated embodiment, the first and second signal contact strips 210d and 210e of each pair 214 can be constructed as substantially mirror images of each other in a plane that extends along the longitudinal and transverse directions L and T, respectively, the plane disposed between the first and second signal contact strips 210d and 210e. Further in accordance with the illustrated embodiment, the four pairs 214 of signal contact strips 210 can be constructed substantially identically. However it should be appreciated that the printed circuit board 202 is not limited to the illustrated construction or arrangement of signal contact strips 210, and that the printed circuit board 202 can be alternatively constructed with any suitable arrangement, including one or both of signal contact strips 210 or ground contact strips 212 as desired.

Figure 5:
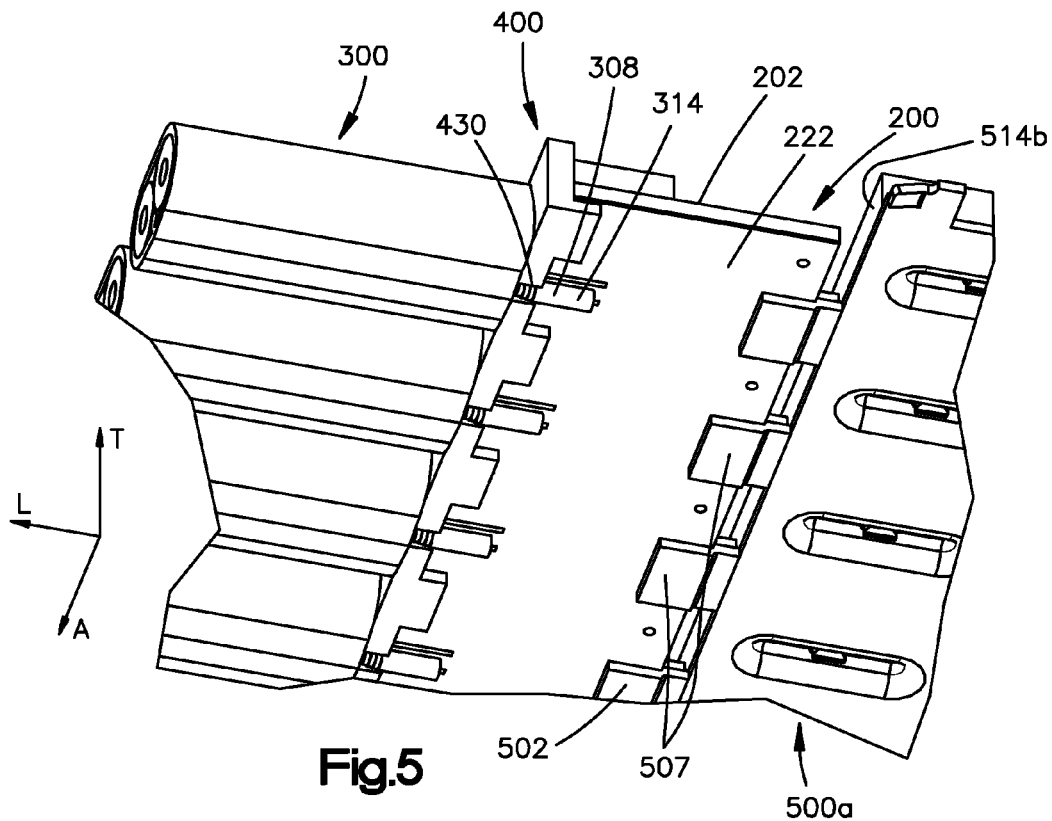
FIG. 5 is another perspective view of the electrical assembly illustrated in FIG. 1B.

The substrate 200, for instance the printed circuit board 202, can further include a ground plate 222 that is configured to be mounted to the lower surface 204f of the substrate body 204 (see FIG. 5). The ground plate 222 can operate to create a ground plane that extends along at least a portion such as substantially the entirety of the lower surface 204f. The ground plate 222 can be configured to be placed in electrical communication with at least one, such as all of the ground contact strips 212 disposed along the upper surface 204e. For example, the printed circuit board 202 can include at least one such as a plurality of plated through holes or vias 224 that extend into the substrate body 204 along the transverse direction. In accordance with the illustrated embodiment, each of the plurality of vias 224 extends through a respective one of the ground contact strips 212, into such as through the substrate body 204, and into such as through the ground plate 222. The plating of each via 224 can comprise any suitable conductive material such as metal, so that the respective ground contact strip 212 through which the via 224 extends is placed in electrical communication with the ground plate 222 via the plating. In an alternative embodiment, lower surface 204f may contain one or more ground traces, electrically connected to the vias 224 and tabs 507, instead of ground plate 222.

Referring now to FIG. 3, each of the plurality of cables 300 can include at least one electrical signal carrying conductor 302 such as a pair of signal carrying conductors 302. Each signal carrying conductor can define a cross-sectional dimension in the form of a diameter having a distance D5, the diameter measured in a plane defined by the lateral and transverse directions A and T, respectively. Each of the plurality of cables 300 can further include at least one electrically insulative layer 304 such as a pair of electrically insulative layers 304, each electrically insulative layer 304 surrounding a respective one of the pair of signal carrying conductors 302. The electrically insulative layers 304 of each cable 300 can reduce the crosstalk imparted by one of the signal carrying conductors 302 of the cable 300 to the other of the signal carrying conductors 302 of the cable 300. Each of the plurality of cables 300 can further include an electrically conductive ground jacket 306 that surrounds both of the respective insulative layers 304 of the cable 300. The ground jacket 306 can include a ground conductor 308 that can be supported by the ground jacket 306. Each of the plurality of cables 300 can further include an outer layer 310 that is electrically insulative and surrounds the respective ground jacket 306 and the ground conductor 308. The outer layer 310 can reduce the crosstalk imparted by the respective cable 300 to others of the plurality of cables 300. The insulative and outer layers 304 and 310 can be constructed of any suitable dielectric material, such as plastic. The signal carrying conductors 302 and the ground conductors 308 can be constructed of any suitable electrically conductive material, such as copper.

The pair of conductors 302 and respective insulative layers 304 of each cable 300 can be carried within the ground jacket 306 and the outer layer 310 so that the conductors 302 are spaced apart from each other a distance D6 that can be defined by a respective location on the outer surface of each conductor 302 that is closest to the other conductor 302 of the pair of conductors 302. In accordance with the illustrated embodiment, each cable 300, and in particular the outer layer 310 of each cable 300, can define a first or lateral cross-sectional dimension D7 and a second or transverse cross-sectional dimension D8.

Each of the plurality of cables 300 can have an end 312 that can be configured to be mounted or otherwise attached to the substrate 200 so as to place the cable 300 in electrical communication with the substrate 200. For example, the end 312 of each cable 300 can be configured such that a portion of the ground conductor 308 is exposed, the exposed portion of each ground conductor 308 defining a respective ground conductor end 314 that can be electrically connected to the substrate 200 (see FIG. 5). For example, respective portions of the insulative and outer layers 304 and 310 and the ground jacket 306 of each cable 300 can be removed from the respective ground conductors 308 at the end 312 of each cable 300 so as to expose the ground conductors ends 314. Alternatively, the plurality of cables 300 can be manufactured such that the respective ground conductors 308 extend longitudinally outward from the insulative and outer layers 304 and 310 and the ground jacket 306 at the end 312 of each cable 300, so as to expose the ground conductor ends 314.

The ground conductors end 314 of each cable 300 can be electrically connected to a respective ground plane of a complementary electrical component to which the cable 300 is mounted, for instance the substrate 200. For example, in accordance with the illustrated embodiment, the ground conductor 308 of each of the plurality of cables 300 can be attached to the ground plate 222 of the printed circuit board 202, such that the ground conductor 308, and thus the ground jacket 306, of each of the plurality of cables 300 is electrically connected to the ground plane of the printed circuit board 202 via the ground plate 222. The ground conductors 308 of the plurality of cables 300 can be attached to the ground plate 222 using any suitable attachment method, for instance by soldering the ground conductors 308 to the ground plate 222, bonding the ground conductors 308 to the ground plate 222 with a conductive material, or otherwise attaching the ground conductors 308 to the ground plate 222. In this regard, each ground conductor 308 can provide an electrical path to ground, or ground path from the ground jacket 306 of each respective cable 300 of the plurality of cables 300 to the ground plane of the complementary electrical component.

The end 312 of each cable 300 can further be configured such that respective portions of each of the signal carrying conductors 302 of the cable 300 are exposed, the exposed portion of each signal carrying conductor 302 defining a respective signal conductor end 316 that can be electrically connected to the substrate 200. For example, respective portions of the insulative and outer layers 304 and 310 and the ground jacket 306 of each cable 300 can be removed from the respective signal carrying conductors 302 at the end 312 so as to expose the signal conductors ends 316. The respective portions of the insulative layers and outer layers 304 and 310 and the ground jacket 306 of each cable 300 can be removed such that each signal conductor end 316 extends outward from the insulative and outer layers 304 and 310 and the ground jacket 306 a distance D9 along the longitudinal direction L. In this regard, it can be said that each signal conductor end 316 defines a length D9 along the longitudinal direction L. Alternatively, the plurality of cables 300 can be manufactured such that the respective signal carrying conductors 302 extend longitudinally outward the distance D9 from the insulative and outer layers 304 and 310 and the ground jacket 306 at the end 312 of each cable 300, so as to expose the signal conductor ends 316.

The signal conductor ends 316 of each cable 300 can be electrically connected to a complementary electrical component to which the cable 300 is mounted, for instance the substrate 200. For example, in accordance with the illustrated embodiment, the signal conductor ends 316 of each of the plurality of cables 300 can be attached to a respective pair 214 of signal contract strips 210. The signal conductor ends 316 of each of the plurality of cables 300 can be attached to respective signal contract strips 210 of a respective pair 214 of signal contract strips 210 using any suitable attachment method. In accordance with the illustrated embodiment, the signal conductor ends 316 can be attached to respective signal contract strips 210 by bonding the signal conductor ends 316 to the signal contract strips 210 using a conductive material, which can be an adhesive such as a conductive epoxy, as described in more detail below. Alternatively, the signal conductor ends 316 can be soldered to the respective signal contract strips 210, or can be otherwise attached to the respective signal contract strips 210 as desired. In this regard, each of the plurality of cables 300 can be placed in electrical communication with the printed circuit board 202.

Referring now to FIGS. 4A-4D, the organizer 400 to align a plurality of electrical cable conductors, such as signal carrying conductors 302, for electrical connection with complementary electrical conductors, such as conductive elements 203 of substrate 200. Organizer 400 can further be configured to be attached to a complementary electrical component, for instance the printed circuit board 202. The organizer 400 can include an organizer body 402 that can be constructed of any suitable electrically insulative or nonconductive material, such as plastic or the like. The organizer body 402 can include a first portion that can be configured as a cavity portion 404 that at least partially defines a plurality of cavities 416, as described in more detail below. The cavity portion 404 can be configured to be attached to a complementary electrical component, for instance the printed circuit board 202. In accordance with the illustrated embodiment, the cavity portion 404 can include a front wall 406 that extends between a first end 406a and an opposed second end 406b that is spaced from the first end 406a along the lateral direction A, such that the front wall 406 is elongate in the lateral direction A. The front wall 406 can define an outward facing front surface 406c, an opposed inward facing rear surface 406d that is spaced from the front surface 406c along the longitudinal direction L, and an upper surface that can define an outer surface 406e of the front wall 406, and an opposed lower surface that can define an inner surface 406f of the front wall 406 that is spaced from the outer surface 406e along the transverse direction T. The outer and inner surfaces 406e and 406f of the front wall 406 can be spaced apart a distance D10 along the transverse direction T.

The cavity portion 404 can further include opposed first and second side walls 408 and 410. The first side wall 408 can define an outward facing side surface 408a, an opposed inward facing side surface 408b that is spaced from the outward facing side surface 408a along the lateral direction A, an outer surface 408c, and an opposed inner surface 408d that is spaced from the outer surface 408c along the transverse direction T. Similarly the second side wall 410 can define an outward facing side surface 410a, an opposed inward facing side surface 410b that is spaced from the outward facing side surface 410a along the lateral direction A, an outer surface 410c, and an opposed inner surface 410d that is spaced from the outer surface 410c along the transverse direction T. The outer and inner surfaces 408c and 408d, and 410c and 410d of the first and second side walls 408 and 410, respectively, can be spaced apart the distance D10 along the transverse direction T. In this regard, it can be said that the first and second side walls 408 and 410 each define a respective height along the transverse direction T, for example as defined by the outer and inner surfaces 408c and 408d, and 410c and 410d, respectively, that is substantially equal to a height along the transverse direction T of the front wall 406, for example as defined by the outer and inner surfaces 406e and 406f.

The first and second side walls 408 and 410 can extend rearward with respect to the front wall 406 along the longitudinal direction L. In accordance with the illustrated embodiment, the first side wall 408 is disposed substantially at the first end 406a and the second side wall 410 is disposed substantially at the second end 406b. The first and second side walls 408 and 410 can be integral with the front wall 406, for instance such that the front wall 406 and the first and second side walls 408 and 410 are monolithic. Alternatively, the first and second side walls 408 and 410 can be separate and attached to the front wall 406.

The cavity portion 404 can at least partially define at least one cavity 412, the at least one cavity 412. For example, the at least one cavity 412 can be at least partially defined by one or more of the front wall 406 and the first and second side walls 408 and 410. The cavity portion 404 can further include at least one divider wall 414 such as a plurality of divider walls 414. The plurality of divider walls 414 can be disposed in the at least one cavity 412 and spaced from each other along the lateral direction A. In accordance with the illustrated embodiment, at least one such as each of the plurality of divider walls 414 can extend rearward with respect to the front wall 406 along the longitudinal direction L. Thus, the plurality of divider walls 414 can extend substantially parallel to each other and parallel to the first and second side walls 408 and 410. In accordance with the illustrated embodiment, each of the plurality of divider walls 414 can extend rearward from the rear surface 406d of the front wall 406 along the longitudinal direction L. Each divider wall 414 can define opposed first and second side surfaces 414a and 414b that are spaced from each other along the lateral direction A, an outer surface 414c, and an opposed inner surface 414d that is spaced from the outer surface 414c along the transverse direction T. The outer and inner surfaces 414c and 414d of each divider wall 414 can be spaced apart the distance D10 along the transverse direction T. In this regard, it can be said that each divider wall 414 defines a height along the transverse direction T, for example as defined by the outer and inner surfaces 414c and 414d, respectively, that is substantially equal to the respective heights along the transverse direction T of the front wall 406 and the first and second side walls 408 and 410.

In accordance with the illustrated embodiment, the plurality of divider walls 414 are disposed in the at least one cavity 412 so as to divide the at least one cavity 412 into a plurality of cavities 416. In this regard, it can be said that the organizer body 402, and more particularly the cavity portion 404, at least partially defines the plurality of cavities 416. In accordance with the illustrated embodiment, the cavity portion 404 is constructed using a plurality of divider walls 414 comprising seven divider walls 414 that are disposed in the at least one cavity 412 and spaced equally apart from each other and from the first and second side walls 408 and 410, respectively, along the lateral direction A, thereby defining a plurality of cavities 416 comprising eight cavities 416, each of the cavities defining substantially equal cross-sectional dimensions along the lateral direction A.

Each of cavities 416 may be understood to be at least partially defined by a pair of opposed walls. For example, one or more of cavities 416 may be defined by opposed first and second side walls 408 and 410, opposed first side wall 408 and divider wall 414, opposed divider walls 414, or opposed divider wall 414 and second side wall 410—all of which being opposed along the lateral direction A. A plurality of opposed walls may therefore define the plurality of cavities 416. Each cavity 416, as defined by opposed walls, may also be understood to support at least a portion of one of the plurality of electrical conductors, such as electrically conductive elements 203 or signal contact strip 210. In an exemplary embodiment, each portion of an electrical conductor(s) supported by a cavity 416 may be aligned or not aligned with the opposed walls. When aligned, each portion of an electrical conductor(s) supported by a cavity 416 may be positioned such that a straight line intersecting the opposed walls of the cavity 416 also passes through the supported portion of an electrical conductor(s). Such may be the case when, for example, electrically conductive elements 203 are disposed above surface 204e along the transverse direction T. When not aligned, each portion of an electrical conductor(s) supported by a cavity 416 may be positioned such that a straight line intersecting the opposed walls of the cavity 416 does not pass through the supported portion of an electrical conductor(s). Such may be the case when, for example, electrically conductive elements 203 are disposed flush with surface 204e along the transverse direction T Each of the plurality of cavities 416 can be configured to receive at least a portion of a respective cable 300, such as the signal conductor end 316 of a respective cable 300, as described in more detail below. In accordance with the illustrated embodiment, the cavities 416 of the plurality of cavities 416 are disposed adjacent to one another along the lateral direction A. In this regard, it can be said that the cavity portion 404 includes a plurality of cavities 416 and that the plurality of cavities 416 are disposed adjacent to one another along the first direction. Each cavity 416 of the plurality of cavities 416 defines a maximum dimension along the lateral direction A that is less than the maximum dimension of the cavity 412 along the lateral direction A.

Further in accordance with the illustrated embodiment, the plurality of divider walls 414 can be spaced substantially equidistant from one another along the lateral direction A, such that each cavity 416 of the plurality of cavities 416 defines a respective cross-sectional dimension, for instance a width along the lateral direction A, that is substantially identical to respective cross-sectional dimensions of each other cavity 416 of the plurality of cavities 416. In this regard, the plurality of cavities 416 can be substantially equally sized relative to one another, such that each cavity 416 displaces a volume that is substantially equal to respective volumes displaced by each other cavity 416 of the plurality of cavities 416. At least one divider wall 414 such as each of the plurality of divider walls 414 can be integral with the front wall 406, for instance such that the front wall 406 and the plurality of inner divider walls 414 are monolithic. Alternatively, at least one such as all of the plurality of inner divider walls 414 can be separate and attached to the front wall 406. Furthermore, it should be appreciated that the cavity portion 404 can be constructed such that the front wall 406, the first and second side walls 408 and 410, and the plurality of inner divider walls 414 are monolithic, and thus that the cavity portion 404 can be monolithic.

The cavity portion 404 can define an abutment surface 404a of organizer 400 that is configured to abut the upper surface 204e of the printed circuit board 202 when the organizer 400 is attached to the printed circuit board 202. In accordance with the illustrated embodiment, the abutment surface 404a includes the inner surface 406f of the front wall 406, the inner surface 408d of the first side wall 408, the inner surface 410d of the second side wall 410, and the respective inner surfaces 414d of each of the plurality of inner walls 414. When the organizer is attached to the printed circuit board 202, the abutment surface 404a can engage with the upper surface 204e of the printed circuit board 202 so as to create substantially a seal between the abutment surface 404a can engage with the upper surface 204e of the printed circuit board 202.

The organizer body 402 can further include a second portion that can be configured as a wall such as an end wall 418 of the organizer body 402. The end wall 418 can extend between a first end 418a and an opposed second end 418b that is spaced from the first end 418a along the lateral direction A, such that the end wall 418 is elongate along the lateral direction A. In accordance with the illustrated embodiment, the front wall 406 is spaced from the end wall 418 a distance along the longitudinal direction L that is shorter than the spacing along the lateral direction between the first and second side walls 408 and 410, such that the cavity portion 404 can be said to be elongate along the lateral direction A.

The end wall 418 can define an upper end 418c and an opposed lower end 418d, the lower end 418d spaced from the upper end 418c along the transverse direction T. The end wall 418 can define any suitable height along the transverse direction T, as defined by the upper and lower ends 418c and 418d, respectively, as desired. For example, in accordance with the illustrated embodiment the end wall 418 defines a height along the transverse direction T that is taller than the distance D10. The end wall 418 can define an upper surface 418e at the upper end 418c, an opposed lower surface 418f at the lower end 418d, a front surface 418g, and an opposed rear surface 418h that is spaced from the front surface 418g along the longitudinal direction L. The end wall 418 can define any suitable length along the lateral direction A, for instance as defined by the first and second end 418a and 418b, respectively. In accordance with the illustrated embodiment, the end wall 418 defines a length in the lateral direction A that is longer than the length in the lateral direction A of the front wall 406. In this regard, the end wall 418 can define a length in the lateral direction A that is longer than that of the cavity portion 404.

The cavity portion 404 can extend outward with respect to the end wall 418. In accordance with the illustrated embodiment, the cavity portion 404 extends substantially along the longitudinal direction L, such that the front wall 406 is oriented substantially parallel with respect to the end wall 418 and spaced from the end wall 418 along the longitudinal direction L. Further in accordance with the illustrated embodiment, the first and second side walls 408 and 410 and the plurality of divider walls 414 extend between the front wall 406 and the end wall 418. In this regard, the plurality of cavities 416 can be further defined by the end wall 418. For example, respective ones of the plurality of cavities 416 can be defined by the front wall 406, the first and second side walls 408 and 410, respective ones of the plurality of divider walls 414, and the end wall 418. In this regard, it can be said that the organizer body 402 defines the plurality of cavities 416.

The cavity portion 404 can be integral with the end wall 418, such that the front wall 406, the first and second side walls 408 and 410, and the plurality of divider walls 414 are monolithic. In this regard, it can be said that the cavity portion 404 extends outward from the end wall 418 along the longitudinal direction L. Alternatively, the end wall 418 can be separate and can be configured to be affixed to the cavity portion 404, including for instance the front wall 406, the first and second side walls 408 and 410, and the plurality of divider walls 414. The cavity portion 404 can extend outward with respect to the end wall 418 at any location along the end wall 418 between the upper and lower ends 418c and 418d, respectively. In accordance with the illustrated embodiment, the end wall 418 is disposed substantially at the upper end 418c of the end wall 418, such that the upper surface 418e of the end wall 418 is substantially coplanar with the outer surfaces 406e, 408c, and 410c of the front wall 406, the first side wall 408, and the second side wall 410, respectively.

The front wall 406 can be spaced from the end wall 418 along the longitudinal direction L such that a distance D11 along the longitudinal direction L is defined by the rear surface 406d of the front wall 406 and the rear surface 418h of the end wall 418. In accordance with the illustrated embodiment, the distance D11 can be at least substantially equal to or longer than the distance D9, such that the distance D11 is longer than the respective lengths of the signal conductor ends 316 of the cables 300 along the longitudinal direction L.

The organizer 400 can further include at least one retention member 420 supported by the organizer body 402. The at least one retention member 420 can be configured to retain the organizer 400 in an attached position relative to a complementary electrical component, such as the printed circuit board 202. For example, the at least one retention member 420 can be constructed as a tab 422 that extends outward with respect to the end wall 418 and forwards toward the front wall 406. The tab 422 can be integral with the end wall 418, and thus can be integral with the organizer body 402. For instance, the tab 422 can be monolithic with the organizer body 402, and thus can be said to extend outward from the end wall 418. The illustrated tab 422 defines an upper surface that can define an inner surface 422a of the tab 422, and an opposed lower surface that can define an outer surface 422b, the outer surface 422b spaced from the inner surface 422a along the transverse direction T. The tab 422 can further include at least one, such as a plurality of securement members that are configured to engage with the complementary securement members of printed circuit board 202, For example, the securement member of tab 422 and securement member of the printed circuit board 202 may be configured and function in a manner similar to that of apertures 522 and latch ramp 636, respectively, as discussed below in connection with FIGS. 8E and 10B.

The organizer 400 can be constructed such that the inner surface 422a of the tab 422 is spaced from the abutment surface 404a a distance D12 that is substantially equal to the thickness TH of the printed circuit board 202, such that when the organizer 400 is attached to the printed circuit board 202, the printed circuit board 202 is received between the abutment surface 404a of the cavity portion 404 and the inner surface 422a of the tab 422 such that an interference fit is generated between the organizer 400 and the printed circuit board 202. For example, in accordance with the illustrated embodiment, the tab 422 is constructed such that when the organizer 400 is attached to the printed circuit board 202, the inner surface 422a of the tab 422 engages with the lower surface 204f of the substrate body 204 of the printed circuit board 202. In this regard, the at least one retention member 420, such as the tab 422, can be configured to engage the printed circuit board 202 so as to retain the organizer in an attached position relative to a complementary electrical component, such as the printed circuit board 202. Furthermore, the cavity portion 404, the end wall 418, and the tab 422, and thus the organizer body 402, define a recess 424 that is sized to receive at least a portion of the printed circuit board 202 when the printed circuit board 202 is inserted into the recess 424 along a mating direction M that can be, for instance, the longitudinal direction L.

Further in accordance with the illustrated embodiment, the tab 422 defines a substantially planar inner surface 422a in a plane defined by the lateral direction A and the longitudinal direction L, such that when the organizer 400 is attached to the printed circuit board 202, substantially the entirety of the inner surface 422a of the tab 422 engages the lower surface 204f of the substrate body 204 of the printed circuit board 202. It should be appreciated that the tab 422 is not limited to the illustrated configuration, and that the tab 422 surface can be alternatively configured so as to create interference fit engagement between the organizer 400 and the printed circuit board 202. For example, in accordance with one alternative embodiment, the inner surface 422a of the tab 422 can define one or more projections that extend out from the inner surface 422a, for example upward along the transverse direction T. The one or more projections can be configured to engage with the lower surface 204f of the substrate body 204 of the printed circuit board 202, such that less than an entirety of the inner surface 422a of the tab 422 is configured to engage with the lower surface 204f of the substrate body 204 of the printed circuit board 202. In accordance with another alternative embodiment, the inner surface 422a of the tab 422 can define a planar surface that is angularly offset relative to the plane defined by the lateral direction A and the longitudinal direction L, such that less than an entirety of the inner surface 422a of the tab 422 is configured to engage with the lower surface 204f of the substrate body 204 of the printed circuit board 202.

The organizer 400 can be constructed such that the tab 422 can extend outward from the end wall 418 at any location along the end wall 418 between the upper and lower ends 418c and 418d, respectively. In accordance with the illustrated embodiment, the end wall 418 has a height, for instance as defined by the upper and lower ends 418c and 418d of the end wall 418, such that the tab 422 is disposed substantially at, and thus can be said to be supported by the organizer body 402 at, the lower end 418d of the end wall 418, and such that the distance along the transverse direction T between the inner tab surface 422a and the abutment surface 404a of the cavity portion is substantially equal to the distance D12. Further in accordance with the illustrated embodiment, the organizer includes a plurality of tabs 422 comprising five tabs 422 that extend from lower end 418d of the end wall 418. A first tab 422 of the plurality of tabs 422 is disposed substantially at the first end 418a of the end wall 418, and a second tab 422 of the plurality of tabs 422 is disposed substantially at the second end 418b of the end wall 418. Three additional tabs 422 are disposed between the first and second tabs 422 along the lower end 418d of the end wall 418, the three additional tabs 422 spaced equally from each other and from the first and second tabs 422 along the lateral direction A. It should be appreciated that the organizer 400 is not limited to the illustrated number or arrangement of tabs 422, and that the organizer 400 can be alternatively constructed with any suitable number of tabs 422 disposed in accordance with any suitable arrangement along the end wall 418. It should further be appreciated that the organizer 400 is not limited to the illustrated retention members 420 constructed as tabs 422, and that the organizer 400 can be alternatively constructed using any other suitable retention members 420 as desired.

With continuing reference to FIGS. 4A-4D, the organizer 400 can be constructed such that each of the plurality of cavities 416 is configured to at least partially receive a signal conductor end 316 of a respective one of the plurality of cables 300. For example, the end wall 418 can define a plurality of circular apertures 426 that extend through the end wall 418 of the organizer body 402 to respective ones of cavities 416. Each of the plurality of apertures 426 configured to receive a signal conductor end 316 of a respective one of the plurality of cables 300 such that each of the signal conductors ends extend from the respective apertures into their respective cavities 416. In accordance with the illustrated embodiment, the end wall can define a plurality of apertures 426 comprising eight apertures 426 that extend through the end wall 418 along substantially the longitudinal direction L, the apertures 426 spaced apart from each other along the lateral direction A such that each of the plurality of apertures 426 is open to a respective one of the plurality of cavities 416. Each of the plurality of apertures 426 can define an inner surface 428. The plurality of apertures 426 can be spaced from the upper end 418c of the end wall 418 such that at least a portion of the inner surface 428 of each of the plurality of apertures 426 is substantially coincident with, such as spaced slightly above along the transverse direction T, a plane defined by the abutment surface 404a of the cavity portion 404.

Each of the plurality of apertures 426 can define a respective cross-sectional dimension that is substantially equal to the respective cross-sectional dimension of each other aperture 426 of the plurality of apertures 426. For example, in accordance with the illustrated embodiment, each aperture 426 of the plurality defines a cross-sectional dimension in the form of a diameter having distance D13, the diameter measured in a plane defined by the lateral and transverse directions A and T, respectively. The distance D13 can be substantially equal to, such as slightly larger than, the distance D5 of the diameter of the signal conductor end 316 of each of the plurality of cables 300, such that the respective signal conductor ends 316 of each of the plurality of cables 300 can be disposed into respective ones of the apertures 426, and thus into respective ones of the plurality of cavities 416.

Referring now to FIGS. 4B-4D and 5, organizer 400 can further be constructed such that that the organizer body 402 is configured to at least partially receive the ground conductor end 314 of each of the plurality of cables 300. For example, the end wall 418 can define a plurality of apertures 430 that extend into the lower end 418d of the end wall 418 in an upward direction toward the upper end 418c, along the transverse direction T. Apertures 430 may be, for example, semi-circular groove. Each of the plurality of apertures 430 can define a cross-sectional dimension in a plane defined by the lateral direction A and the transverse direction T that is substantially equal to, such as slightly larger than, a corresponding cross-sectional dimension of the ground conductor end 314 of each of the plurality of cables 300.

Referring now to FIGS. 1A, 2, 4A-4D, and 5, when the organizer 400 is attached to a complementary electrical component, such as the printed circuit board 202, the plurality of cavities 416 are isolated from each other by cooperation of the organizer body 402 and the complementary electrical component. For example, the organizer 400 can be attached to the printed circuit board 202, by inserting a corresponding portion of the printed circuit board 202, such as the rear end 204b of the substrate body 204, into the recess 424 defined by the organizer body 402 along the mating direction M. The printed circuit board 202 can be inserted into the recess 424 until the abutment surface 404a of the cavity portion 404 abuts the upper surface 204e of the substrate body 204 of the printed circuit board 202 and the inner surface 422a of the tab 422 contacts with the lower surface 204f of the substrate body 204 of the printed circuit board 202. The printed circuit board 202 is fully inserted into the recess 424 of the organizer body 402, such that the organizer 400 is attached to the printed circuit board 202, when the rear end 204b of the substrate body 204 abuts the end wall 418 of the organizer body 402.

With the organizer 400 attached to the printed circuit board 202, the organizer 400 and the printed circuit board 202 cooperate to isolate each of the plurality of cavities 416 from each other cavity 416 of the plurality of cavities 416. The isolation of each cavity 416 relative to each other cavity 416 can include one or both of physical isolation or electrical isolation. For example, a first cavity 416a of the plurality of cavities 416 can be defined by corresponding portions of the front wall 406 and the end wall 418, the first side wall 408, and a first divider wall 414a that is disposed adjacent the side wall 408 such that no other divider walls 414 are disposed between the first side wall 408 and the first divider wall 414a. A second cavity 416b that is adjacent the first cavity 416a can be defined by corresponding portions of the front wall 406 and the end wall 418, the first divider wall 414a, and a second divider wall 414b that is disposed adjacent the first divider wall 414a such that no other divider walls 414 are disposed between the first divider wall 414a and the second divider wall 414b. The first and second cavities 416a and 416b are physically isolated from each other and from each other cavity 416 of the plurality of cavities at least to the extent that electrically conductive material 432, such as a conductive epoxy that is disposed into the first cavity 416a will be physically isolated from, and thus will not come into contact with, electrically conductive material 432 that is disposed into the second cavity 416b. Similarly, a first conductor end 316a of a respective one of the plurality of cables 300 that is disposed into the first cavity 416a will be physically isolated from, and thus will not come into contact with, a second conductor end 316b of the respective one of the plurality of cables 300 that is disposed into the second cavity 416b. For example, FIG. 1B show an exemplary cavity 416 filled with electrically conductive material 432, such as electrically conductive epoxy, which is bonded to both the plurality of electrical conductors and the received cable conductors, thus placing the two in electrical communication. In an exemplary embodiment, electrically conductive material 432, such as epoxy, may be inserted into one or more, up to all, of cavities 416 through cavity opening 434 along the transverse direction T. Cavity opening 434 may be defined by cavity walls, such as, for example walls 408, 410, and 414.

Furthermore, the first and second cavities 416a and 416b can also be electrically isolated relative to one another. For instance, the first conductor end 316a disposed in the first cavity 416a can be at least partially electrically isolated, by at least the first divider wall 414a, from electrical interference that might be imparted to the first conductor end 316a by the second conductor end 316b disposed in the second cavity 416b. Similarly, the second conductor end 316b disposed in the second cavity 416b can be at least partially electrically isolated, by at least the first divider wall 414a, from electrical interference that might be imparted to the second conductor end 316b generated by the first conductor end 316a disposed in the first cavity 416a. It should be appreciated that although the isolation characteristics of the organizer 400 are only discussed with respect to the illustrated first and second cavities 416a and 416b, that each cavity 416 of the plurality of cavities 416 is one or both of physically or electrically isolated from each other cavity 416 of the plurality of cavities 416. Further, while the electrical assembly 10 in FIG. 1A depicts organizer 400 with an equal number of cavities 416 and signal conductor ends 316 in cavities 416, organizer 400 may contain empty cavities and/or signal conductor ends 316 connected to substrate 200, such as connected to a signal contact strips 210, but not contained in a cavity.

Each of the plurality of cavities 416 can additionally act to isolate a corresponding portion of the complementary electrical component that the organizer 400 is attached to. For example, in accordance with the illustrated embodiment, a first width of the printed circuit board 202, for example as defined by the first and second sides 204c and 204d, respectively, is substantially equal to a second width of the end wall 418 of the organizer body 402, for example as defined by the first and second ends 418a and 418b, respectively. When the organizer 400 is attached to the printed circuit board 202 and properly aligned with respect to the printed circuit board 202, the first side 204c of the substrate body 204 of the printed circuit board 202 is disposed substantially at the first end 418a of the end wall 418 and the second side 204d of the substrate body 204 is disposed substantially at the second end 418b of the end wall 418. With the organizer 400 attached to and properly aligned with the printed circuit board 202, the offset portions 218 of each of the first and second signal contact strips 210d and 210e of each pair 214 are enclosed by respective ones of the plurality of cavities 416, such that each offset portion 218 is isolated from each other offset portion 218 of the plurality of signal contact strips 210. It can therefore be understood that, when attached to substrate 200, each one of the plurality of cavities 416 may receive a respective one of the complementary electrical conductors, such as such as conductive elements 203 of substrate 200. The complementary electrical conductors, such as such as conductive elements 203 of substrate 200, may therefore be understood to be supported by a respective one of the plurality of cavities 416 or organizer 400.

Further in accordance with the illustrated embodiment, the plurality of apertures 426 are spaced along the lateral direction A such that they are substantially aligned with respective ones of the offset portions 218 of the plurality of signal contact strips 210. Thus, when the signal conductor ends 316 of each of the plurality of cables 300 are inserted into respective ones of the plurality of apertures 426 in a forward direction toward the front wall 406, each of the signal conductor ends 316 will be substantially aligned with the offset portion 218 of a respective one of the plurality of signal contact strips 210.

With the organizer 400 attached to the printed circuit board 202 in a properly aligned position, each of the plurality of cables 300 can be electrically connected to the printed circuit board 202 so as to place the plurality of cables 300 in electrical communication with the printed circuit board 202. The signal conductor ends 316 of each of the plurality of cables 300 can be inserted into respective ones of the plurality of apertures 426, and thus disposed in respective ones of the plurality of cavities 416. To place the respective signal conductor ends 316 of the plurality of cables 300 into electrical communication with corresponding offset portions 218 of each of the plurality of signal contact strips 210, each of the plurality of cavities 416 can be at least partially filled with an electrically conductive material 432 such as a conductive epoxy or the like, which is bonded to both the plurality of electrical conductors and the received cable conductors, thus placing the two in electrical communication. In an exemplary embodiment, electrically conductive material 432, such as epoxy, may be inserted into one or more, up to all, of cavities through cavity opening 434 long the transverse direction T.

The electrically conductive material 432 should be disposed into each of the plurality of cavities 416 such that the electrically conductive material 432 at least partially covers the offset portion 218 of each of the plurality of signal contact strips 210 and at least partially encloses the signal conductor ends 316 of each of the plurality of cables 300, so as to place the signal conductor ends 316 in electrical communication with respective ones of the signal contact strips 210, thereby placing the plurality of cables 300 in electrical communication with the printed circuit board 202. In this regard, the conductive epoxy facilitates electrical communication between the signal conductor ends 316 and corresponding ones of the signal contact strips 210. Because each cavity 416 is physically isolated from each other cavity 416 of the plurality of cavities 416, electrically conductive material 432 disposed into a particular one of the plurality of cavities 416 will not come into contact with electrically conductive material 432 disposed into any of the other cavities 416 of the plurality, thereby preventing the occurrence of electrical shorts that are typical of solder reflow processes.

With the organizer 400 attached to the printed circuit board 202, the ground conductor ends 314 of each of the plurality of cables 300 can be placed into electrical communication with the printed circuit board 202. For example, the ground conductor end 314 of each of the plurality of cables 300 can be disposed into a corresponding one of the apertures 430 defined by the organizer body 402. When slotted in a corresponding one of the apertures 430, each ground conductor end 314 can be placed into contact with the ground plate 222 of the printed circuit board 202, for example by bending or otherwise deforming the ground conductor end 314 such that at least a portion of the ground conductor end 314 abuts the ground plate 222. Each of the ground conductor ends 314 can then be secured to the ground plate 222, for example by soldering the ground conductor ends 314 to the ground plate 222, bonding the ground conductor ends 314 to the ground plate 222 with a conductive epoxy, or otherwise securing the ground conductor ends 314 to the ground plated 222 as desired.

Referring now to FIGS. 1B and 5, the electrical assembly 10 can further include a second complementary electrical component, such as a leadframe assembly 500a that supports a plurality of complementary electrical conductors, such as a plurality of electrical contacts 502. The illustrated leadframe assembly 500a may be similar to leadframe assembly 500b, with the exception of tabs 507 and the location of mounting ends 510b, described in detail below. Leadframe assemblies 500a and 500b may be further constructed substantially in accordance with U.S. provisional patent application Ser. No. 61/624,238, filed on Apr. 13, 2012, the disclosure of which is incorporated herein by reference in its entirety. The leadframe assembly 500a can be configured to be mated to the printed circuit board 202 so as to be place the leadframe assembly 500a in electrical communication with the printed circuit board 202, and thus with the plurality of cables 300, for example by mating the plurality of electrical contacts 502 supported by the leadframe assembly 500a to respective ones of the plurality of electrically conductive elements 203 supported by the printed circuit board. In the illustrated embodiment, leadframe assembly 500a may contain one or more electrical conductors, such as, for example, one or more pairs of signal contacts 506 that include respective mounting ends 510b that extend from the mounting end 524b of the leadframe assembly substantially along the longitudinal direction L and in a direction opposite the mating end 524a. In an alternative embodiment, electrical conductors may also include signal traces in addition to, or in place of, signal contacts 506.

Leadframe assembly 500a may also contain one or more tabs 507 that extend from the opposed rear end 514b of the ground plate 512 substantially along the longitudinal direction L and in a direction opposite the front end 514a. Tabs 507 may be integral to ground plate 512 such that tabs 507 and ground plate 512 are monolithic. Alternatively, tabs 507 may be in electrical communication with the ground plate 512. Tabs 507 and mating ends 510b of leadframe assembly 500a may be fully or partially aligned with each other and spaced apart from each other along transverse direction T.

Continuing with FIGS. 1B and 5, tabs 507 and mating ends 510b may be spaced apart from each other a distance that is substantially the same as the thickness TH of substrate 200 in order to define a recess 509 that is sized to receive at least a portion of substrate printed circuit board 202 when the leadframe assembly 500a is mated to the printed circuit board 202 and retain the printed circuit board 202 and the leadframe assembly 500a in their respective positions. When leadframe assembly 500a is mated to the printed circuit board 202, (1) each of the respective mounting ends 510b of the signal contacts 506 may come into contact, such as electrical contact, with electrical contact pads 206 and (2) tabs 507 come into contact, such as electrical contact, with ground plate 512.

Figure 6:
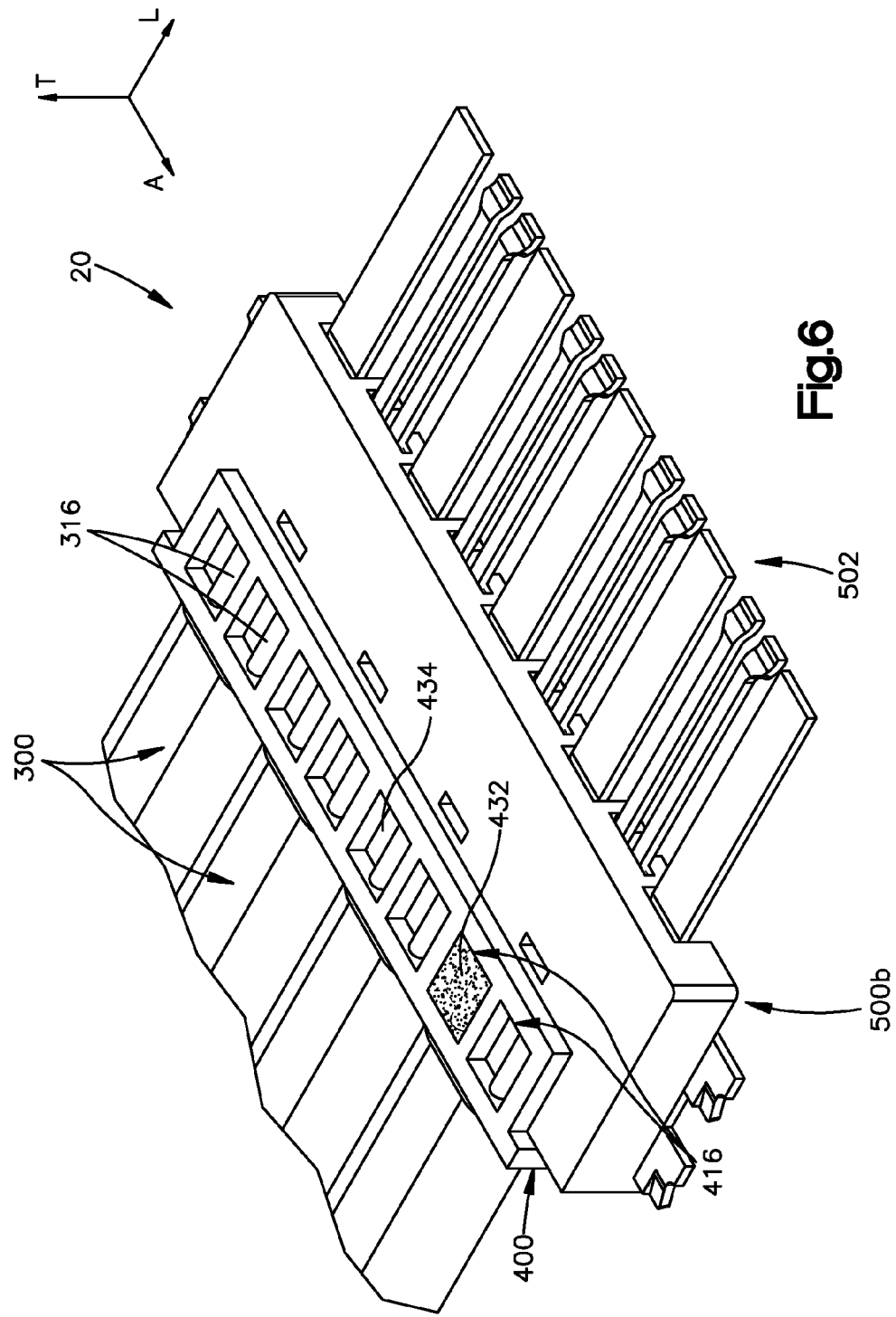
FIG. 6 is a perspective view of an electrical assembly in accordance with another embodiment, the electrical assembly including a leadframe assembly, a plurality of cables mounted to the leadframe assembly, and an organizer mounted to the leadframe assembly and configured to isolate respective portions of one or both of the leadframe assembly and the cables.

Referring now to FIG. 6, an electrical assembly 20 constructed in accordance with another embodiment can include a plurality of cables 300, a leadframe assembly 500b supporting a plurality of complementary electrical conductors, such as a plurality of electrical contacts 502, and an organizer 400 that is configured to be attached to the leadframe assembly 500b so as to place the plurality of cables 300 in electrical communication with the plurality of electrical contacts 502 supported by the leadframe assembly 500b. The leadframe assembly 500b can be configured to be supported by a third complementary electrical component, such as a first electrical connector that is configured to support at least one leadframe assembly 500b such as a plurality of leadframe assemblies 500b. The first electrical connector can be configured to mate with a fourth complementary electrical component, such as a second electrical connector. The first and second electrical connectors can be mated so as to place the first electrical connector in electrical communication with the second electrical connector, and thus to place the plurality of cables 300 in electrical communication with the second electrical connector. The second electrical connector can be configured to be mounted to a fifth complementary electrical component, such as a second printed circuit board, thereby placing the plurality of cables 300 in electrical communication with the second printed circuit board, via the first and second electrical connectors. It should be appreciated that the first and second electrical connectors can be constructed as any suitable variety of electrical connector, for instance as vertical electrical connectors, right-angle electrical connectors, or any combination thereof, as desired. For example, FIG. 6 depicts an exemplary cavity 416 filled with electrically conductive material 432, such as epoxy, in a manner similar to that described above in connection with organizer 400. Further, while the electrical assembly 20 in FIG. 6 depicts organizer 400 with an equal number of cavities 416 and signal conductor ends 316 in cavities 416, organizer 400 may contain empty cavities and/or signal conductor ends 316 connected to leadframe housing 500b, such as connected to signal contacts 506, but not contained in a cavity.

Figure 7A:
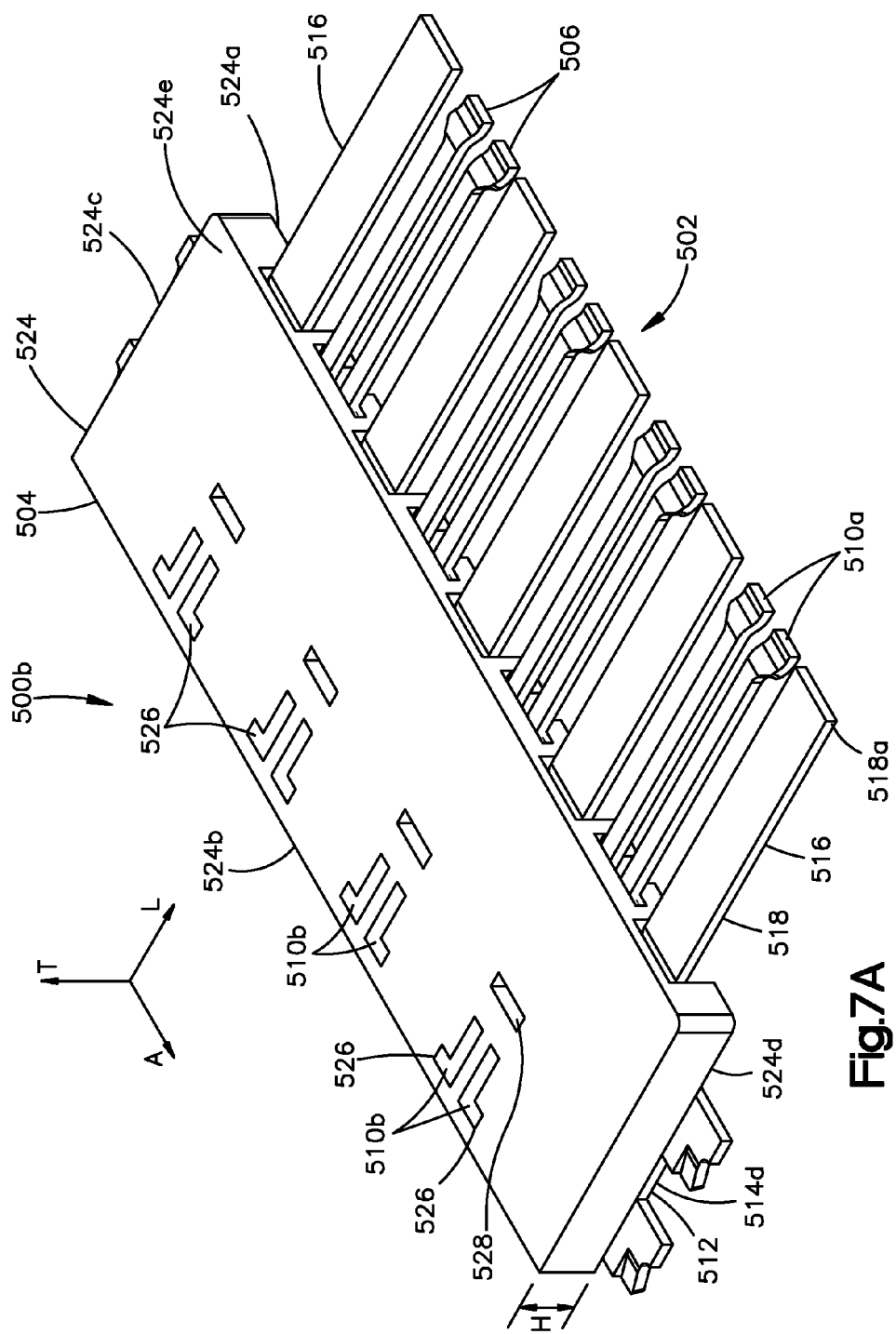
FIGS. 7A-7B are perspective views of the leadframe assembly illustrated in FIG. 6.
Figure 7B:
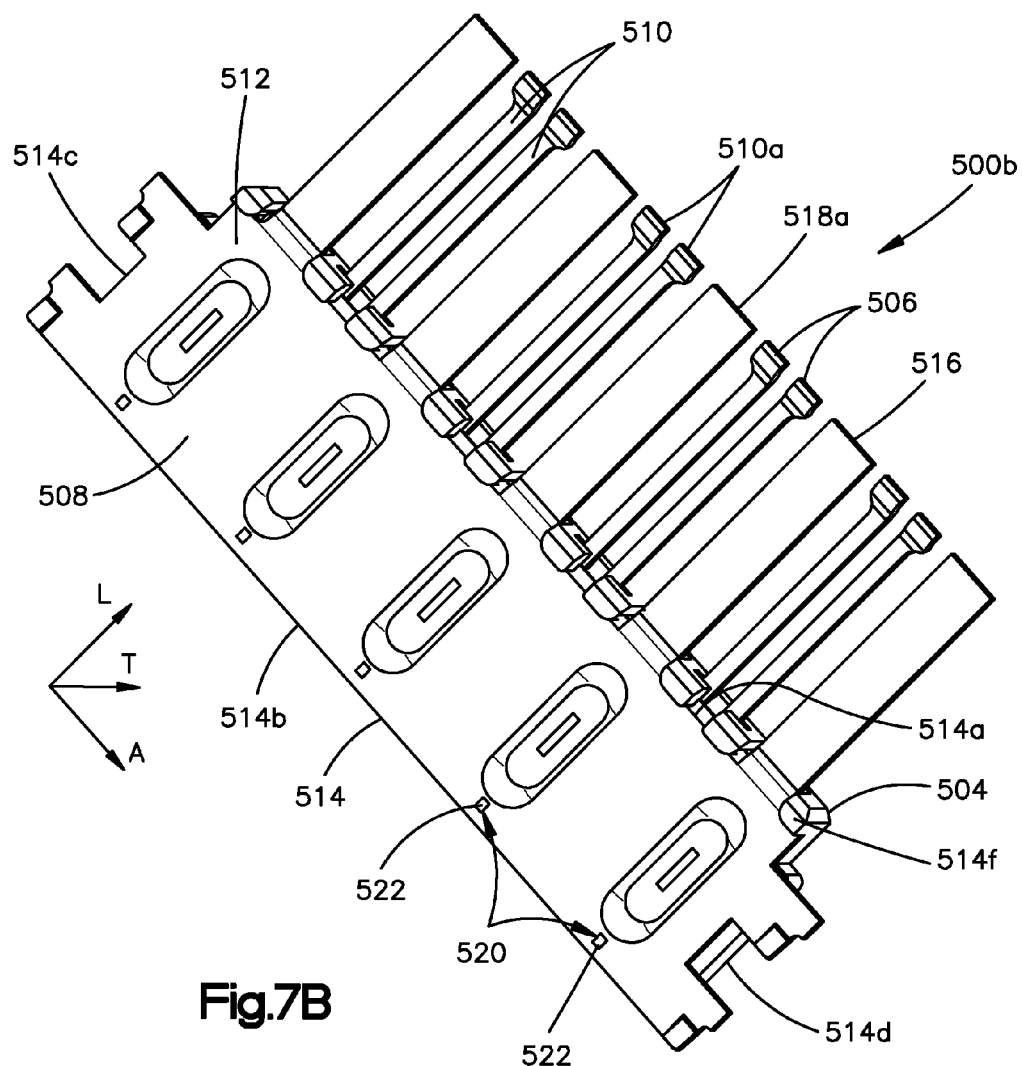

Referring now to FIGS. 7A-7B, the leadframe assembly 500b can include a plurality of electrical contacts 502 and a dielectric, or electrically insulative, leadframe housing 504 configured to support the plurality of electrical contacts 502. The plurality of electrical contacts 502 can include at least one signal contact 506 and at least one ground contact 508. In accordance with the illustrated embodiment, the plurality of electrical contacts 502 includes a plurality of signal contacts 506 that are configured to be supported by the leadframe housing 504. Each of the plurality of signal contacts 506 includes a substantially beam shaped signal contact body 510 that defines a mating end 510a and an opposed mounting end 510b that is spaced from the mating end 510a along the longitudinal direction L.

Leadframe housing 504 can be made of any suitable dielectric material such as plastic. Signal contacts 506 and ground contacts 508 can be overmolded by leadframe housing 504, such that leadframe housing 504 can define an insert molded leadframe assembly (IMLA), or be otherwise supported by the leadframe housing 504. For instance, signal contacts 506 and ground contacts 508 can be stitched in the leadframe housing 504. The signal contacts 506 can be arranged in pairs, which can define differential signal pairs 750. Alternatively, the signal contacts 506 can be provided as single-ended signal contacts. One or more up to all of adjacent pairs 750 of electrical signal contacts 506 are separated by a ground contact 508 along the lateral direction L.

The plurality of electrical contacts 502 further includes a ground contact 508 configured as a ground plate 512 configured to be supported by the leadframe housing 504. The ground plate 512 includes a plate body 514 that defines a front end 514a, an opposed rear end 514b that is spaced from the front end 514a along the longitudinal direction L, a first side 514c, and an opposed second side 514d that is spaced from the first side 514c along the lateral direction A. The ground plate 512 further includes at least one, such as a plurality of ground mating beams 516 that extend outward with respect to the front end 514a of the plate body 514. Each of the plurality of ground mating beams 516 includes a beam body 518 that defines a mating end 518a that is spaced from the front end 514a of the plate body 514 along the longitudinal direction L. The plurality of ground mating beams 516 can be integral with the plate body 514 such that the ground mating beams 516 and the ground plate 512 are monolithic. Alternatively, the plurality of ground mating beams 516 can be separate and can be attached to the plate body 514. The leadframe assembly 500b can define at least one securement member such as a plurality of securement members 520 that are configured to engage with complementary securement members supported by the organizer 600. In accordance with the illustrated embodiment, the plate body 514 defines a plurality of securement members 520 in the form of a plurality of apertures 522 that extend at least partially into, such as through the plate body 514 of the ground plate 512, substantially along the transverse direction T. In an alternative embodiment, ground plate 512 may be replaced by one or more ground traces which electrically connected ground conductor ends 314 to beam bodies 518.

The leadframe housing 504 includes a housing body 524 that defines a front end that can define a mating end 524a, an opposed rear end that can define a mounting end 524b that is spaced from the mating end 524a along the longitudinal direction L, a first side 524c, an opposed second side 524d that is spaced from the first side 524c along the lateral direction A, an upper end that defines an upper surface 524e, and an opposed lower end that defines a lower surface 524f that is spaced from the upper surface 524e along the transverse direction T. The housing body 524 can have height H, for example as defined by the upper and lower surfaces 524e and 524f, respectively that can also be said to be the height H of the leadframe housing 504. The housing body 524 can be configured to support the plurality of signal contacts 506. For example, in accordance with the illustrated embodiment, the housing body 524 is overmolded onto the plurality of signal contacts 506. Alternatively, the plurality of signal contacts 506 can be stitched into the leadframe housing 504 or otherwise supported by the leadframe housing 504 as desired. The housing body 524 can be constructed of any suitable electrically insulative or nonconductive material, such as plastic or the like.

The housing body 524 can be constructed such that at least a portion of the upper surface 524e is open. For example, in accordance with the illustrated embodiment, the housing body 524 defines a plurality of substantially "L" shaped openings 526 that extend into the upper surface 524e substantially along the transverse direction T. The plurality of openings 526 can be located closer to the mounting end 524b of the housing body 524 than to the mating end 524a, for example substantially at the mounting end 524b. Furthermore, the plurality of openings 526 can be spaced apart from each other along the lateral direction A such that each of the plurality of openings 526 is aligned with the mounting end 510b of a respective one of the signal contacts 506, such that the mounting end 510b of each of the plurality of signal contacts 506 is exposed. The lower surface 524f of the housing body 524 can be configured to at least partially receive the ground plate 512 such that the ground plate 512 is attached to the leadframe housing 504 and supported by the leadframe housing 504.

Referring now to FIGS. 8A-8E, the organizer 600 can be constructed substantially similarly to the organizer 400, with the exception of certain elements of the organizer 600 that are differently constructed, as described in more detail below. Accordingly, in the interest of succinctness, elements of the organizer 600 that are substantially similar to corresponding elements of the organizer 400 are labeled with reference numbers that are incremented by 200. For example, the organizer 600 has an organizer body 602 that can include a cavity portion 604 and an end wall 618. The organizer 600 can further include at least one retention member 620 such as a plurality of retention members 620.

In accordance with the illustrated embodiment, the cavity portion 604 can be constructed such that the plurality of cavities 616 are defined as pairs 632 of cavities 616. The cavity portion 604 of the illustrated organizer 600 defines four pairs 632 of cavities 616, the pairs 632 of cavities 616 being spaced apart from each other along the lateral direction A. Each pair 632 of cavities 616 is configured to receive the signal conductor ends 316 of a respective one of the plurality of cables 300. In the depicted embodiment in FIGS. 8A-8E, adjacent pairs 632 of cavities 616 may be separated by a spacer cavity 622.

Similar to organizer 400, each of cavities 616 may be understood to be at least partially defined by a pair of opposed walls. For example, one or more of cavities 616 may be defined by opposed first and second side walls 608 and 610, opposed first side wall 608 and divider wall 614, opposed divider walls 614, or opposed divider wall 614 and second side wall 610—all of which being opposed along the lateral direction A. A plurality of opposed walls may therefore define the plurality of cavities 616. Each cavity 616, as defined by opposed walls, may also be understood to support at least a portion of one of the plurality of electrical conductors, such as mounting ends 510b of signal contacts 506. In an exemplary embodiment, each portion of an electrical conductor(s) supported by a cavity 616 may be aligned or not aligned with the opposed walls. When aligned, each portion of an electrical conductor(s) supported by a cavity 616 may be positioned such that a straight line intersecting the opposed walls of the cavity 616 also passes through the supported portion of an electrical conductor(s). Such may be the case when, for example, mounting ends 510b of signal contacts 506 are disposed above surface 524e along the transverse direction T. When not aligned, each portion of an electrical conductor(s) supported by a cavity 616 may be positioned such that a straight line intersecting the opposed walls of the cavity 616 does not pass through the supported portion of an electrical conductor(s). Such may be the case when, for example, mounting ends 510b of signal contacts 506 are disposed flush with surface 524e along the transverse direction T.

The organizer 600 includes a plurality of retention members 620 constructed as a plurality of projections 634 that extend outward with respect to the end wall 618 and forwards toward the front wall 606. The illustrated projections 634 are narrower along the lateral direction A than the tabs 422 of the organizer 400. The plurality of projections 634 can be integral with the end wall 618, and thus can be integral with the organizer body 602. For instance, the plurality of projections 634 can be monolithic with the organizer body 602, and thus can be said to extend outward from the end wall 618. Each of the illustrated projections 634 defines an upper surface that can define an inner surface 634a of the projection 634, and an opposed lower surface that can define an outer surface 634b, the outer surface 634b spaced from the inner surface 634a along the transverse direction T.

The organizer 600 can further include at least one, such as a plurality of securement members that are configured to engage with the complementary securement members 520 supported by the leadframe assembly 500b, such as the apertures 522 defined by the plate body 514 of the ground plate 512. For example, in accordance with the illustrated embodiment, at least one projection such as a plurality of the projections 634 can define at least one securement member in the form of a latch ramp 636 that is configured to be received in a corresponding one of the plurality of apertures 522 when the organizer 600 is attached to the leadframe assembly 500b. The respective ones of the plurality of projections 634 that defines the latch ramps 636 can be configured to deflect outward as the latch ramps 636 ride along the ground plate 512 as the organizer 600 is attached to the leadframe assembly 500b. The respective ones of the plurality of projections 634 that defines the latch ramps 636 can snap back to their non-deflected positions when the latch ramps 636 are disposed into the respective ones of the plurality of apertures 522. The latch ramps 636 can engage the apertures 522, thereby securing the organizer 600 in an attached position relative to the leadframe assembly 500b. It should be appreciated that the organizer 600 is not limited to the illustrated number or arrangement of projections 634, and that the organizer 600 can be alternatively constructed with any suitable number of projections 634 disposed in accordance with any suitable arrangement along the end wall 618. It should further be appreciated that the organizer 600 is not limited to the illustrated retention members 620 constructed as projections 634, and that the organizer 600 can be alternatively constructed using any other suitable retention members 620 as desired.

The organizer 600 can be constructed such that the inner surface 634a of the projection 634 is spaced from the abutment surface 604a of organizer 600 a distance D14 that is substantially equal to the height H of the leadframe housing 504, such that when the organizer 600 is attached to the leadframe assembly 500b, the leadframe housing 504 is received between the abutment surface 604a of the cavity portion 604 and the inner surfaces 634a of each of the plurality of projections 634 such that an interference fit is generated between the organizer 600 and the leadframe housing 504. For example, in accordance with the illustrated embodiment, each projection 634 of the plurality of projections 634 is constructed such that when the organizer 600 is attached to the leadframe assembly 500b, the inner surface 634a of each of the plurality of projections 634 engages with the ground plate 512. Furthermore, the cavity portion 604, the end wall 618, and the plurality of projections 634, and thus the organizer body 602, define a recess 624 that is sized to receive at least a portion of the leadframe housing 504 when the leadframe assembly 500b is inserted into the recess 624 along the mating direction M.

The organizer 600 can be constructed such that each of the plurality of cavities 616 is configured to at least partially receive a signal conductor end 316 of a respective one of the plurality of cables 300. For example, the end wall 618 can define a plurality of circular apertures 626 that are constructed substantially the same as the plurality of apertures 426 of the organizer 400. The organizer 600 can further be constructed such that that the organizer body 602 is configured to at least partially receive the ground conductor end 314 of each of the plurality of cables 300. For example, the end wall 618 can define a plurality of apertures 638 that extend through the end wall 618 along substantially the longitudinal direction L, the plurality of apertures 638 spaced apart from each other along the lateral direction A such that each of the plurality of apertures 638 is located substantially between first and second cavities 616 that make up each pair 632 of cavities 616. Each of the plurality of apertures 638 can define a cross-sectional dimension in a plane defined by the lateral direction A and the transverse direction T that is substantially equal to, such as slightly larger than, a corresponding cross-sectional dimension of the ground conductor end 314 of each of the plurality of cables 300.

Referring now to FIGS. 9 and 10A-10B, when the organizer 600 is attached to the leadframe assembly 500b, the plurality of cavities 616 are isolated from each other by cooperation of the organizer body 602 and the leadframe assembly 500b. For example, the organizer 600 can be attached to the leadframe assembly 500b by inserting a corresponding portion of the leadframe housing 504, such as the mounting end 524b of the housing body 524, into the recess 624 defined by the organizer body 602 along the mating direction M. The leadframe housing 504 can be inserted into the recess 624 until the abutment surface 604a of the cavity portion 604 abuts the upper surface 524e of the housing body 524 of the leadframe housing 504, and the inner surfaces 634a of the plurality of projections 634 contacts the lower surface 524f of the housing body 524. The leadframe assembly 500b is fully inserted into the recess 624 of the organizer body 602, such that the organizer 600 is attached to the leadframe assembly 500b, when the mounting end 524b of the housing body 524 abuts the end wall 618 of the organizer body 602. Leadframe assembly 500a may be similarly attached to substrate 200. For example, FIG. 9 depicts an exemplary cavity 616 filled with electrically conductive material 432, such as epoxy, in a manner similar to that described above in connection with organizer 400, which is bonded to both the plurality of electrical conductors and the received cable conductors, thus placing the two in electrical communication. In an exemplary embodiment, electrically conductive material 432, such as epoxy, may be inserted into one or more, up to all, of cavities 616 through cavity opening 434 long the transverse direction T.

With the organizer 600 attached to the leadframe assembly 500b, the organizer 600 and the housing body 524 of the leadframe housing 504 cooperate to isolate each of the plurality of cavities 616 from each other cavity 616 of the plurality of cavities 616. The isolation of each cavity 616 relative to each other cavity 616 can include one or both of physical isolation or electrical isolation, as described above with reference to the organizer 400. Each of the plurality of cavities 616 can additionally act to isolate a corresponding portion of the leadframe assembly 500b. For example, in accordance with the illustrated embodiment, when the organizer 600 is attached to the leadframe assembly 500b and properly aligned with respect to the leadframe assembly 500b, each of the plurality of openings 526 of the housing body 524 are enclosed by respective ones of the plurality of cavities 616, such that the mounting end 510b of each of the plurality of signal contacts 506 is isolated from the mounting end 510b of each of the other signal contacts 506 of the plurality.

Further in accordance with the illustrated embodiment, the plurality of apertures 626 are spaced along the lateral direction A such that they are substantially aligned with respective ones of the plurality of openings 526 of the housing body 524. Thus, when the signal conductor ends 316 of each of the plurality of cables 300 are inserted into respective ones of the plurality of apertures 626 in a forward direction toward the front wall 606, each of the signal conductor ends 316 will be substantially aligned with the mounting end 510b of a respective one of the plurality of signal contacts 506.

With the organizer 600 attached to the leadframe assembly 500b in a properly aligned position, each of the plurality of cables 300 can be electrically connected to the leadframe assembly 500b so as to place the plurality of cables 300 in electrical communication with the leadframe assembly 500b. The signal conductor ends 316 of each of the plurality of cables 300 can be inserted into respective ones of the plurality of apertures 626, and thus disposed in respective ones of the plurality of cavities 616. To place the respective signal conductor ends 316 of the plurality of cables 300 into electrical communication with corresponding mounting ends 510b of each of the plurality of signal contacts 506, each of the plurality of cavities 616 can be at least partially filled with an electrically conductive material 432 such as a conductive epoxy or the like, in a manner similar to that described above in connection with organizer 400, which is bonded to both the plurality of electrical conductors and the received cable conductors, thus placing the two in electrical communication. In an exemplary embodiment, electrically conductive material 432, such as epoxy, may be inserted into one or more, up to all, of cavities 616 through cavity opening 434 long the transverse direction T.

The electrically conductive material 432 should be disposed into each of the plurality of cavities 616 such that the electrically conductive material 432 at least partially covers the mounting ends 510b of each of the plurality of signal contacts 506 and at least partially encloses the signal conductor ends 316 of each of the plurality of cables 300, so as to place the signal conductor ends 316 in electrical communication with respective ones of the signal contacts 506, thereby placing the plurality of cables 300 in electrical communication with the leadframe assembly 500b. In this regard, the conductive epoxy facilitates electrical communication between the signal conductor ends 316 and corresponding ones of the signal contacts 506. Because each cavity 616 is physically isolated from each other cavity 616 of the plurality of cavities 616, an electrically conductive material 432 disposed into a particular one of the plurality of cavities 616 will not come into contact with an electrically conductive material 432 disposed into any of the other cavities 616 of the plurality, thereby preventing the occurrence of electrical shorts that are typical of solder reflow processes.

With the organizer 600 attached to the leadframe assembly 500b, the ground conductor ends 314 of each of the plurality of cables 300 can be placed into electrical communication with the leadframe assembly 500b. For example, the ground conductor end 314 of each of the plurality of cables 300 can be disposed into a corresponding one of the plurality of apertures 638. When inserted into a corresponding one of the plurality of apertures 638, each ground conductor end 314 can be placed into contact with the ground plate 512 of the leadframe assembly 500b, for example by bending or otherwise deforming the ground conductor end 314 such that at least a portion of the ground conductor end 314 abuts the ground plate 512. Each of the ground conductor ends 314 can then be secured to the ground plate 512, for example by soldering the ground conductor ends 314 to the ground plate 512, bonding the ground conductor ends 314 to the ground plate 512 with a conductive epoxy, or otherwise securing the ground conductor ends 314 to the ground plated 512 as desired.

It should be appreciated that a method of electrically connecting the plurality of cables 300 to a complementary electrical component, for instance a substrate 200 such as the printed circuit board 202 or the leadframe assembly 500b can include the step of attaching an organizer to the complementary electrical component. For example, the organizer 400 can be attached to the substrate 200, or the organizer 600 can be attached to the leadframe assembly 500b. The method can further include the step of disposing the signal conductor ends 316 of each of the plurality of cables 300 into respective ones of the plurality of cavities, such as the plurality of cavities 416 of the organizer 400 or the plurality of cavities 616 of the organizer 600. The method can further include the step of at least partially filling each of the plurality of cavities with an electrically conductive material 432. The electrically conductive material 432 facilitates electrical communication between the signal conductor ends 316 of each of the plurality of cables 300 and the substrate 200, or facilitates electrical communication between the signal conductor ends 316 of each of the plurality of cables 300 and the leadframe assembly 500b, respectively.

Figure 11:
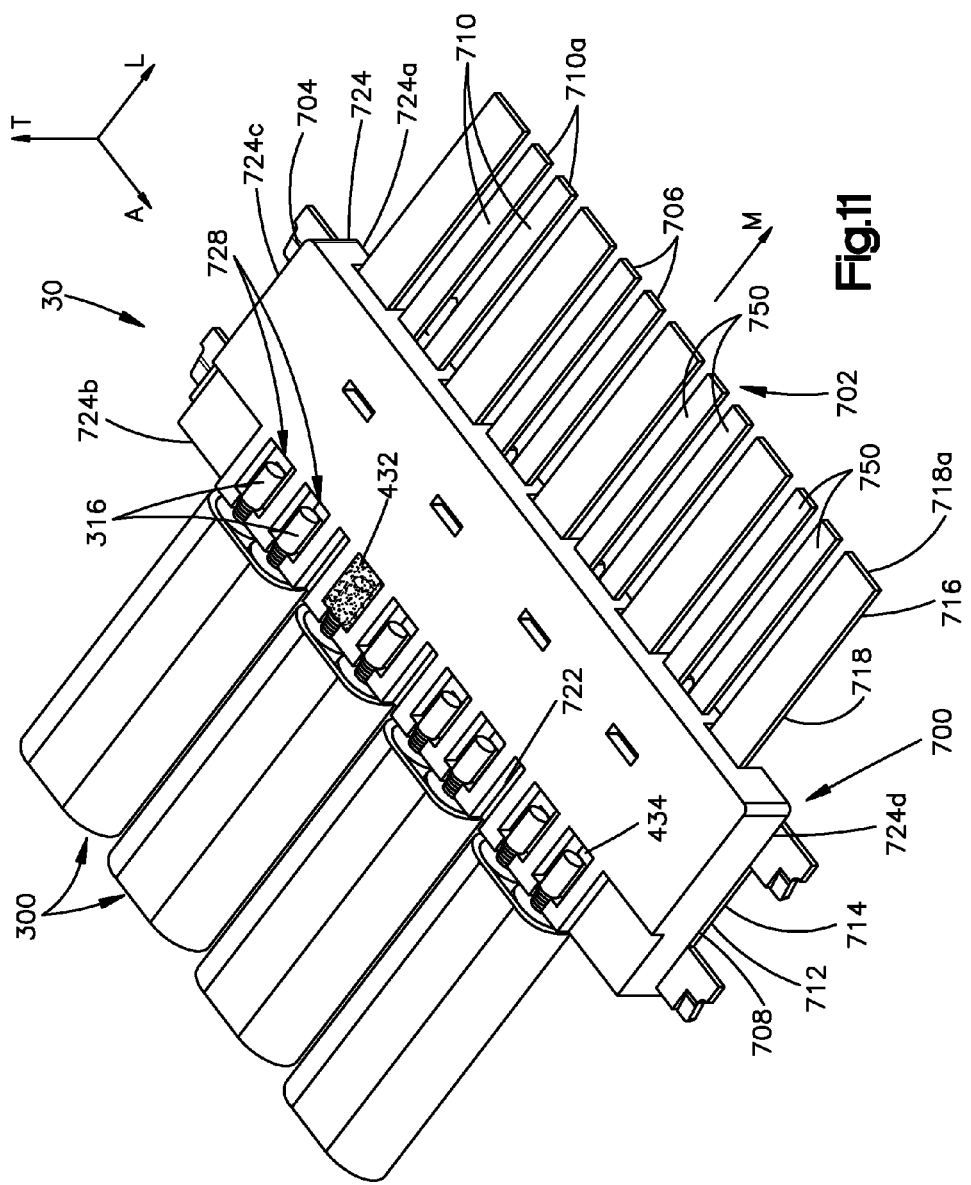
FIG. 11 is a perspective view of an electrical assembly in accordance with still another embodiment, the electrical assembly including a leadframe assembly and a plurality of cables mounted to the leadframe assembly, the leadframe assembly defining a plurality of cavities configured to isolate respective portions of the cables.

Referring now to FIG. 11, an electrical assembly 30 constructed in accordance with still another embodiment can include a leadframe assembly 700 supporting a plurality of complementary electrical conductors, such as a plurality of electrical contacts 702 and a plurality of cables 300, the plurality of cables 300 configured to be mounted to the leadframe assembly 700 so as to place the plurality of cables 300 in electrical communication with the plurality of electrical contacts 702 supported by the leadframe assembly 700.

Figure 12:
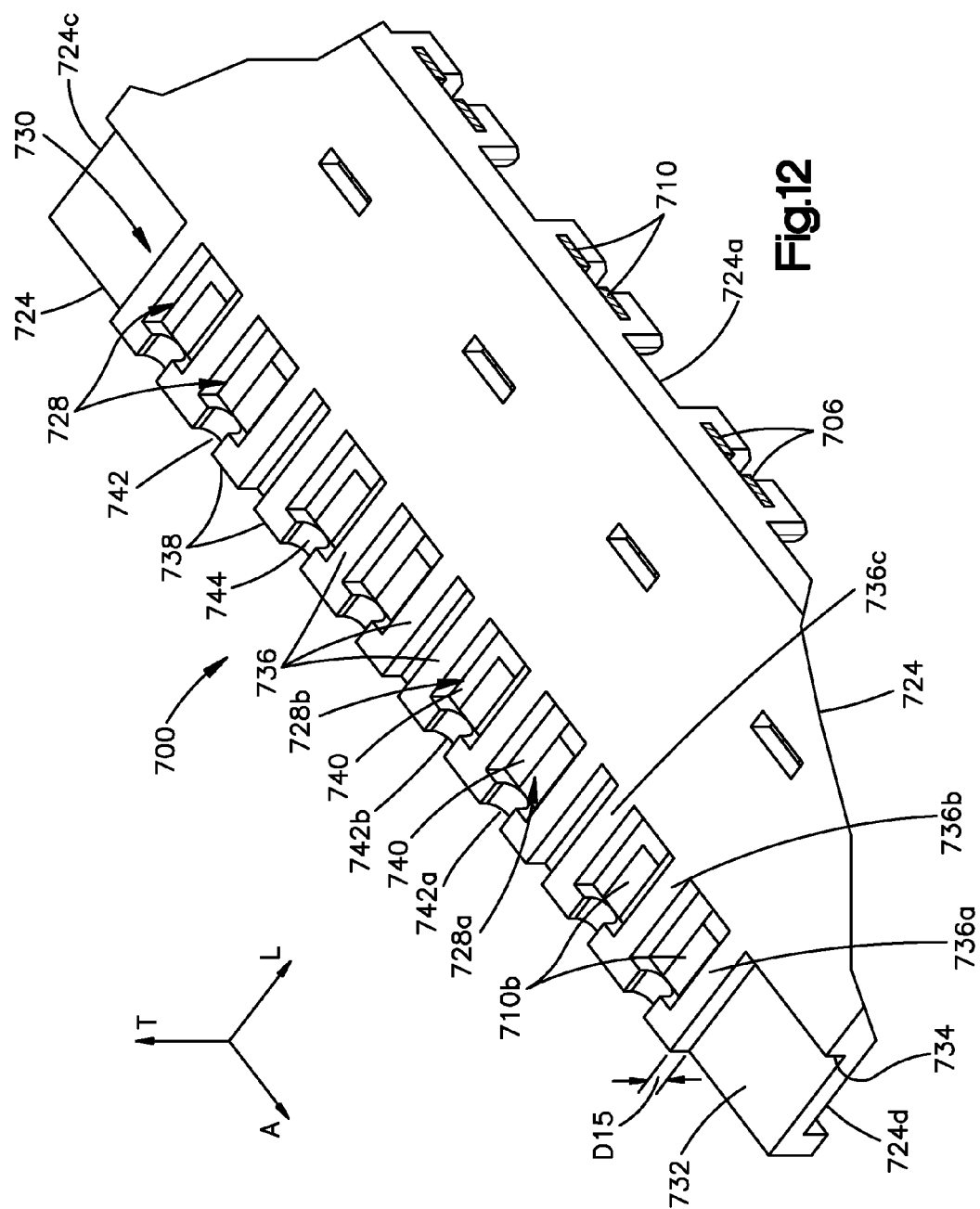
FIG. 12 is perspective view of a portion of a leadframe assembly illustrated in FIG. 11.

Referring now to FIGS. 11 and 12, the leadframe assembly 700 can be constructed substantially similarly to the leadframe assemblies 500a and 500b, with the exception of the leadframe housing 704 that is differently constructed than the leadframe housing of the leadframe assemblies 500a and 500b, as described in more detail below. Accordingly, in the interest of succinctness, elements of the leadframe assembly 700 that are substantially similar to corresponding elements of the leadframe assemblies 500a and 500b are labeled with reference numbers that are incremented by 200. For example, the leadframe assembly 700 includes an electrically insulative housing, such as leadframe housing 704, and a plurality of electrical contacts 702 supported by the leadframe housing 704. In this regard, it can be said that the electrical assembly 30 includes a leadframe housing 704 configured to be supported by an electrical connector and a plurality of electrical contacts 702 supported by the leadframe housing 704.

Similarly to the leadframe assemblies 500a and 500b, the plurality of electrical contacts 702 can include at least one signal contact 706 and at least one ground contact 708. In accordance with the illustrated embodiment, the plurality of electrical contacts 702 includes a plurality of signal contacts 706 that are configured to be supported by the leadframe housing 704. Each of the plurality of signal contacts 706 includes a substantially beam shaped signal contact body 710 that defines a mating end 710a and an opposed mounting end 710b that is spaced from the mating end 710a along the longitudinal direction L. In an alternative embodiment, electrical conductors may also include signal traces in addition to, or in place of, signal contacts 706. The plurality of electrical contacts 702 further includes a ground contact 708 configured as a ground plate 712 configured to be supported by the leadframe housing 704. The ground plate 712 can be constructed substantially identically to the ground plate 512, and therefore includes a plate body 714 and a plurality of ground mating beams 716 that extend outward from the plate body 714 along the longitudinal direction L and are aligned in the lateral direction A. Each of the plurality of ground mating beams 716 includes a beam body 718 that defines a mating end 718a.

With continuing similarity to the leadframe assemblies 500a and 500b, the leadframe housing 704 of the leadframe assembly 700 includes a housing body 724 that defines a front end that can define a mating end 724a, an opposed rear end that can define a mounting end 724b that is spaced from the mating end 724a along the longitudinal direction L, and thus along the mating direction M, a first side 724c, an opposed second side 724d that is spaced from the first side 724c along the lateral direction A, an upper end that defines an upper surface 724e, and an opposed lower end that defines a lower surface 724f that is spaced from the upper surface 724e along the transverse direction T. The lower surface 724f of the housing body 724 can be configured to at least partially receive the ground plate 712 such that the ground plate 712 is attached to the leadframe housing 704 and supported by the leadframe housing 704. In an alternative embodiment, ground plate 712 may be replaced by one or more ground traces which electrically connected ground conductor ends 314 to beam bodies 718.

The housing body 724 of the leadframe housing 704 can define a plurality of cavities 728 configured to isolate respective signal conductor ends 316 of the plurality of cables 300 in a manner similar to organizer 400. The housing body 724 can be constructed so as to at least partially define cavities 728 such that the cavities 728 of the plurality of cavities 728 are isolated relative to one another. In this regard, each cavity 728 of the plurality of cavities 728 is isolated from each other cavity 728 of the plurality of cavities 728. The isolation of each cavity 728 relative to each other cavity 728 can include one or both of physical isolation or electrical isolation, as described above with reference to the organizer 400.

The housing body 724 can be constructed such that the cavities 728 of the plurality of cavities 728 extend into the housing body 724 with respect to the upper surface 724e. In accordance with the illustrated embodiment, the housing body 724 defines a cavity portion 730 that is recessed into the upper surface 724e of the housing body 724. The cavity portion 730 can extend between the first to the second sides 724c and 724d, for example from the first side 724c to the second side 724d, and inward from the mounting end 724b to a location between the mating and mounting ends 724a and 724b, respectively. In this regard, the plurality of cavities 728 is located closer to the mounting end 724b than to the mating end 724a of the leadframe housing 704. Cavity portion 730 may also be understood to be an organizer.

The housing body 724 can define a cavity floor 732 of the cavity portion 730 that is spaced from the upper surface 724e along the transverse direction T. In accordance with the illustrated embodiment, the cavity floor 732 is a substantially planar surface that extends along a plane defined by the longitudinal direction L and the lateral direction A. The cavity floor 732 can be spaced from the upper surface 724e of the housing body 724 a distance D15 along the transverse direction T that is substantially equal to, such as slightly larger than, the distance D5 of the diameter of the signal conductor ends 316 of the plurality of cables 300. The plurality of signal contacts 706 can be supported by the leadframe housing 524 such that at least a portion of the mounting end 710b of each of the plurality of signal contacts 706 is exposed by, for example projects above, the cavity floor 732. In this regard, it can be said that the mounting end 710b of each of the plurality of signal contacts 706 is at least partially exposed in the cavity portion 730. The housing body 724 can further define a forward edge of the cavity portion 730 that can define a forward surface 734 of the cavity portion 730. In accordance with the illustrated embodiment, the forward surface 734 is a substantially planar surface that extends along a plane defined by the lateral direction A and the transverse direction T.

The housing body 724 can define the plurality of cavities 728 in the cavity portion 730. For example, the housing body 724 can define a plurality of divider walls 736 and at least one such as a plurality of rear walls 738, the plurality of divider walls 736 and the at least one rear wall 738 defining respective ones of the plurality of cavities 728. In accordance with the illustrated embodiment, the at least one rear wall 738 can extend substantially along the lateral direction and can be located proximate to, for instance substantially at, the mounting end 724b of the housing body 724. Furthermore, each of the plurality of divider walls 736 can extend substantially along the longitudinal direction L from the forward surface 734 to the at least one rear wall 738. Both the at least one rear wall 738 and the each divider wall 736 of the plurality of divider walls 736 can define respective heights along the transverse direction T that are substantially equal to the distance D15.

The divider walls 736 can be spaced apart from each other along the lateral direction A such that each divider wall 736 is disposed adjacent the mounting end 710b of a respective one of the plurality of signal contacts 706. In accordance with the illustrated embodiment, each mounting end 710b is flanked by a first divider wall 736a disposed on a first side of the mounting end 710b and a second divider wall 736b disposed on a second side of the mounting end 710b, the first and second divider walls 736a and 736b spaced apart from each other along the lateral direction A. The first and second divider walls 736a and 736b, along with a corresponding portion of the at least one rear wall 738, can define a respective one of the plurality of cavities 728, such that the mounting end 710b of each of the plurality of signal contacts 706 is disposed in a corresponding cavity 728 of the plurality of cavities 728.

Similar to organizers 200 and 400, each of cavities 728 may be understood to be at least partially defined by a pair of opposed walls. For example, one or more of cavities 728 may be defined by divider walls 736 opposed along the lateral direction A. The plurality of opposed divider walls 736 may therefore define the plurality of cavities 728. Each cavity 728, as defined by opposed walls 736, may also be understood to support at least a portion of one of the plurality of electrical conductors, such as mounting ends 710b of signal contacts 706. In an exemplary embodiment, each portion of an electrical conductor(s) supported by a cavity 728 may be aligned or not aligned with the opposed walls. When aligned, each portion of an electrical conductor(s) supported by a cavity 728 may be positioned such that a straight line intersecting the opposed walls 736 of the cavity 728 also passes through the supported portion of an electrical conductor(s). Such may be the case when, for example, mounting ends 710b of signal contacts 706 are disposed above bottom surface 724g of cavities 728 along the transverse direction T. When not aligned, each portion of an electrical conductor(s) supported by a cavity 728 may be positioned such that a straight line intersecting the opposed walls 736 of the cavity 728 does not pass through the supported portion of an electrical conductor(s). Such may be the case when, for example, mounting ends 710b of signal contacts 706 are disposed flush with the bottom surface 724g along the transverse direction T The cavity portion 730 can be configured such that the plurality of cavities 728 are defined as pairs 740 of cavities 728. For example, the at least one rear wall 738 is divided into a plurality of rear walls 738. In accordance with the illustrated embodiment, each pair 740 of cavities 728 is defined by first, second, and third divider walls 736a, 736b, and 736c, respectively, that are spaced apart from each other along the lateral direction A, and a respective rear wall 738 that extends from the first divider wall 736a to the third divider wall 736c. In accordance with the illustrated embodiment, the first, second, and third divider walls 736a, 736b, and 736c can be successively spaced apart from each other along the lateral direction A such that no divider walls 736 are disposed between the first and second divider walls 736a and 736b, or between the second and third divider walls 736b and 736c. The first and second divider walls 736a and 736b, along with a corresponding first portion of the rear wall 738, can define a first cavity 728a of the each pair 740. The second and third divider walls 736b and 736c, along with a corresponding second portion of the rear wall 738, can define a second cavity 728b of the each pair 740. The cavity portion 730 of the illustrated leadframe housing 704 defines four pairs 740 of cavities 728, the pairs of cavities 728 spaced apart from each other along the lateral direction A. In accordance with the illustrated embodiment, the cavities 728 of the plurality of cavities 728 are arranged adjacent to one another along the lateral direction A. In the depicted embodiment, adjacent pairs 632 of cavities 728 may be separated by a spacer 722.

Each pair 740 of cavities 728 is configured to receive the signal conductor ends 316 of a respective one of the plurality of cables 300. For example, each of the plurality of end walls 738 can define a pair of apertures 742 that extend into the end wall 738 in a downward direction toward the cavity floor 732, along the transverse direction T. Apertures 742 may be, for example, a semi-circular groove. Each pair of apertures 742 can include first aperture 742a and a second aperture 742b that are spaced apart from each other along the lateral direction A such that each aperture 742 is open to a respective one of the first and second cavities 728a and 728b of each pair 740, respectively.

For example, in accordance with the illustrated embodiment, the first aperture 742a of each pair of apertures 742 is open to the first cavity 728a of each pair 740, and the second aperture 742b of each pair of apertures 742 is open to the second cavity 728b of each pair 740. Each aperture 742 can define an inner surface 744 such that at least a portion of the inner surface 744 of each aperture 742 is substantially coincident with, such as spaced slightly above, along the transverse direction T, the cavity floor 732. Each aperture 742 can define a respective cross-sectional dimension, such as a diameter, that is substantially equal to, such as slightly larger than, the distance D5 of the diameter of the signal conductor end 316 of each of the plurality of cables 300, such that the respective signal conductor ends 316 of each of the plurality of cables 300 can be disposed into respective ones of the apertures 74, and thus into respective ones of the plurality of cavities 728. For example, FIG. 11 show an exemplary cavity 728 filled with electrically conductive material 423, such as epoxy, in a manner similar to that described above in connection with organizer 400, which is bonded to both the plurality of electrical conductors and the received cable conductors, thus placing the two in electrical communication. In an exemplary embodiment, electrically conductive material 432, such as epoxy, may be inserted into one or more, up to all, of cavities 728 through cavity openings 434 long the transverse direction T. Further, while the electrical assembly 30 in FIG. 11 depicts an equal number of cavities 728 and signal conductor ends 316 in cavities 416, electrical assembly 430 may contain empty cavities 728 and/or signal conductor ends 316 connected to leadframe housing 700, such as connected to signal contacts 706, but not contained in a cavity 728. Furthermore, the above structure of the leadframe assembly 700 can be understood to comprise structure similar to organizer bodies 402 and 602 that is monolithic with leadframe housing 704.

Figure 13:
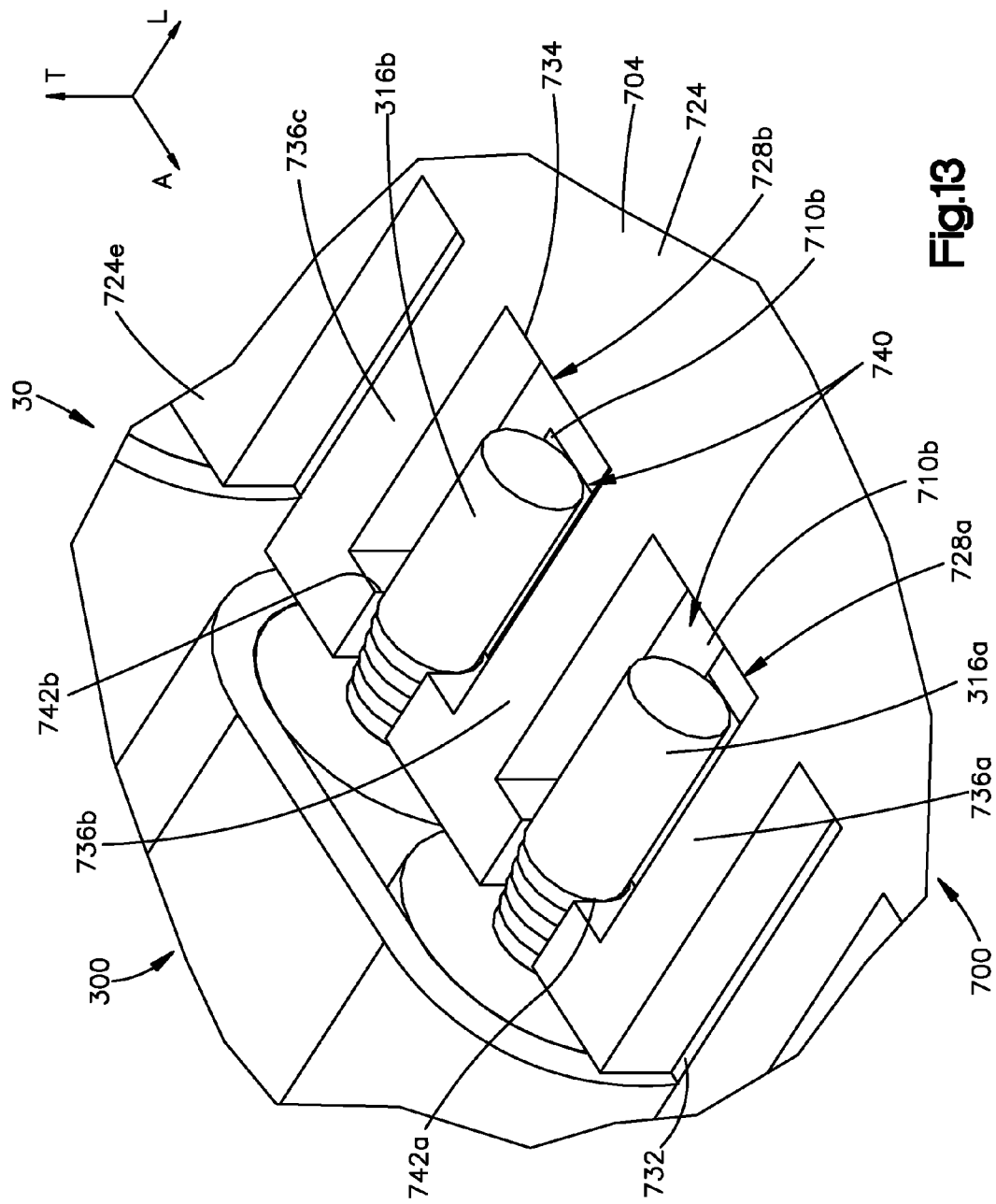
FIG. 13 is a zoomed perspective view of a portion of the leadframe assembly illustrated in FIG. 11.
Figure 14:
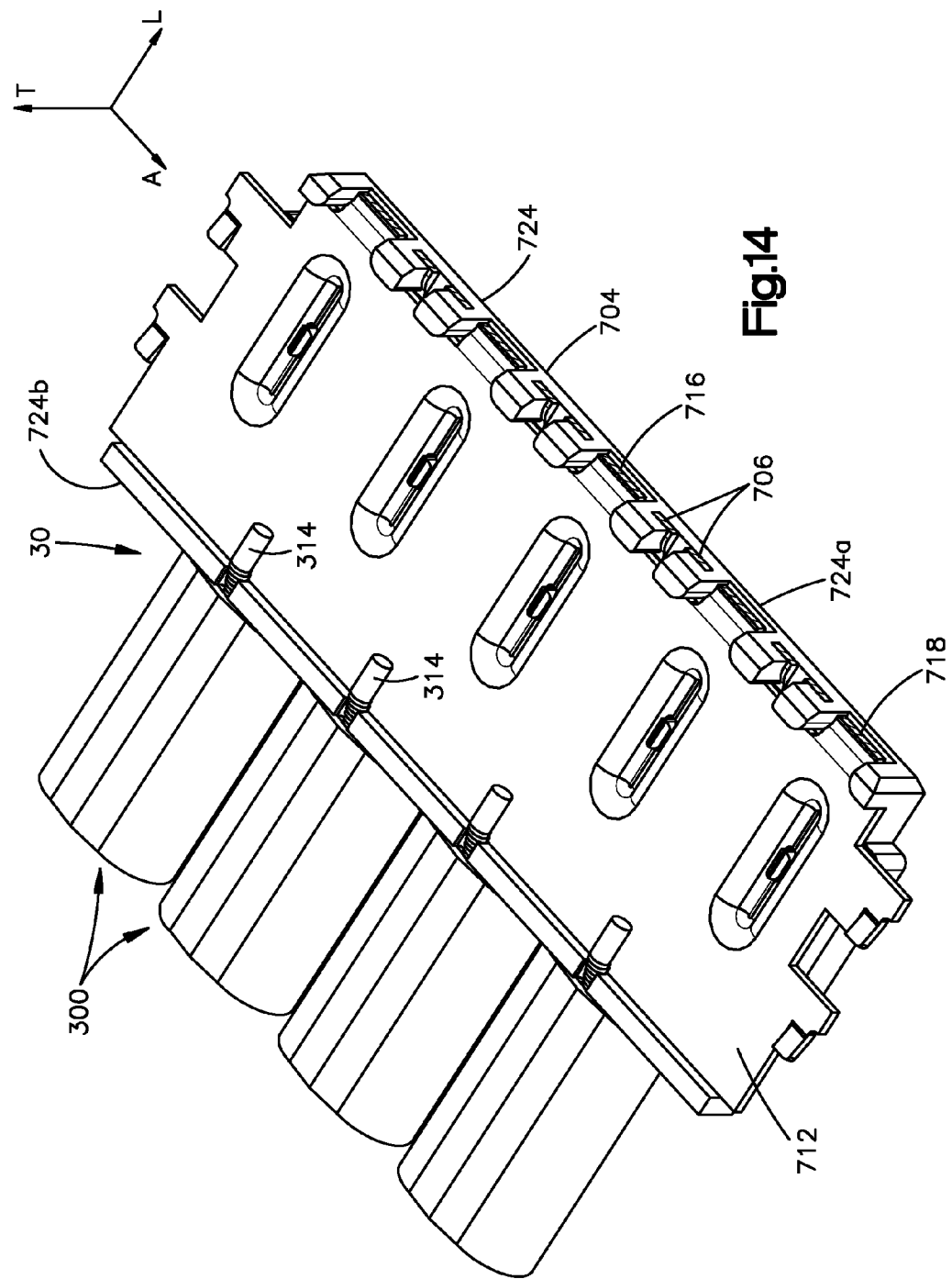
FIG. 14 is a perspective view of a portion of the underside of the electrical assembly illustrated in FIG. 11.

Referring now to FIGS. 13 and 14, FIG. 13 depicts a zoomed in perspective view of a portion of leadframe assembly 700 with the ground plate 712 and beam body 710 removed for clarity. FIG. 14 is a perspective view of a portion of the underside of the electrical assembly illustrated in FIG. 11 with portions of beam body 718 and beam body 710 removed for clarity. Continuing with FIGS. 13 and 14, each aperture 742 can be configured to receive a signal conductor end 316 of a respective one of the plurality of cables 300. For example, a first signal conductor end 316a of a respective one of the plurality of cables 300 can be disposed into the first aperture 742a of a respective pair 740 of cavities 728, and thus into the first cavity 728a of the pair 740, and a second signal conductor end 316b of the respective one of the plurality of cables 300 can be disposed into the second aperture 742b of the respective pair 740 of cavities 728, and thus into the second cavity 728b of the pair 740. Each of the plurality of cables 300 can be electrically connected to the leadframe assembly 700 so as to place the plurality of cables 300 in electrical communication with the leadframe assembly 700. The signal conductor ends 316 of each of the plurality of cables 300 can be inserted into respective ones of the plurality of apertures 742, and thus disposed in respective ones of the plurality of cavities 728. To place the respective signal conductor ends 316 of the plurality of cables 300 into electrical communication with corresponding mounting ends 710b of each of the plurality of signal contacts 706, each of the plurality of cavities 728 can be at least partially filled with an electrically conductive material 432 such as a conductive epoxy or the like, in a manner similar to that described above in connection with organizer 400, which is bonded to both the plurality of electrical conductors and the received cable conductors, thus placing the two in electrical communication. In an exemplary embodiment, electrically conductive material 432, such as epoxy, may be inserted into one or more, up to all, of cavities 728 through cavity opening 434 long the transverse direction T.

The electrically conductive material 432 should be disposed into each of the plurality of cavities 728 such that the electrically conductive material 432 at least partially covers the mounting ends 710b of each of the plurality of signal contacts 706 and at least partially encloses the signal conductor ends 316 of each of the plurality of cables 300, so as to place the signal conductor ends 316 in electrical communication with respective ones of the signal contacts 706, thereby placing the plurality of cables 300 in electrical communication with the leadframe assembly 700. In this regard, the conductive epoxy facilitates electrical communication between the signal conductor ends 316 and corresponding ones of the signal contacts 706. Because each cavity 728 is physically isolated from each other cavity 728 of the plurality of cavities 728, an electrically conductive material 432 disposed into a particular one of the plurality of cavities 728 will not come into contact with an electrically conductive material 432 disposed into any of the other cavities 728 of the plurality, thereby preventing the occurrence of electrical shorts that are typical of solder reflow processes.

Furthermore, the ground conductor ends 314 of each of the plurality of cables 300 can be placed into electrical communication with the leadframe assembly 700. For example, the ground conductor end 314 of each of the plurality of cables 300 can be placed into contact with the ground plate 712 of the leadframe assembly 700, for example by bending or otherwise deforming the ground conductor end 314 such that at least a portion of the ground conductor end 314 abuts the ground plate 712. Each of the ground conductor ends 314 can then be secured to the ground plate 712, for example by soldering the ground conductor ends 314 to the ground plate 712, bonding the ground conductor ends 314 to the ground plate 712 with a conductive epoxy, or otherwise securing the ground conductor ends 314 to the ground plated 712 as desired.

Figure 15:
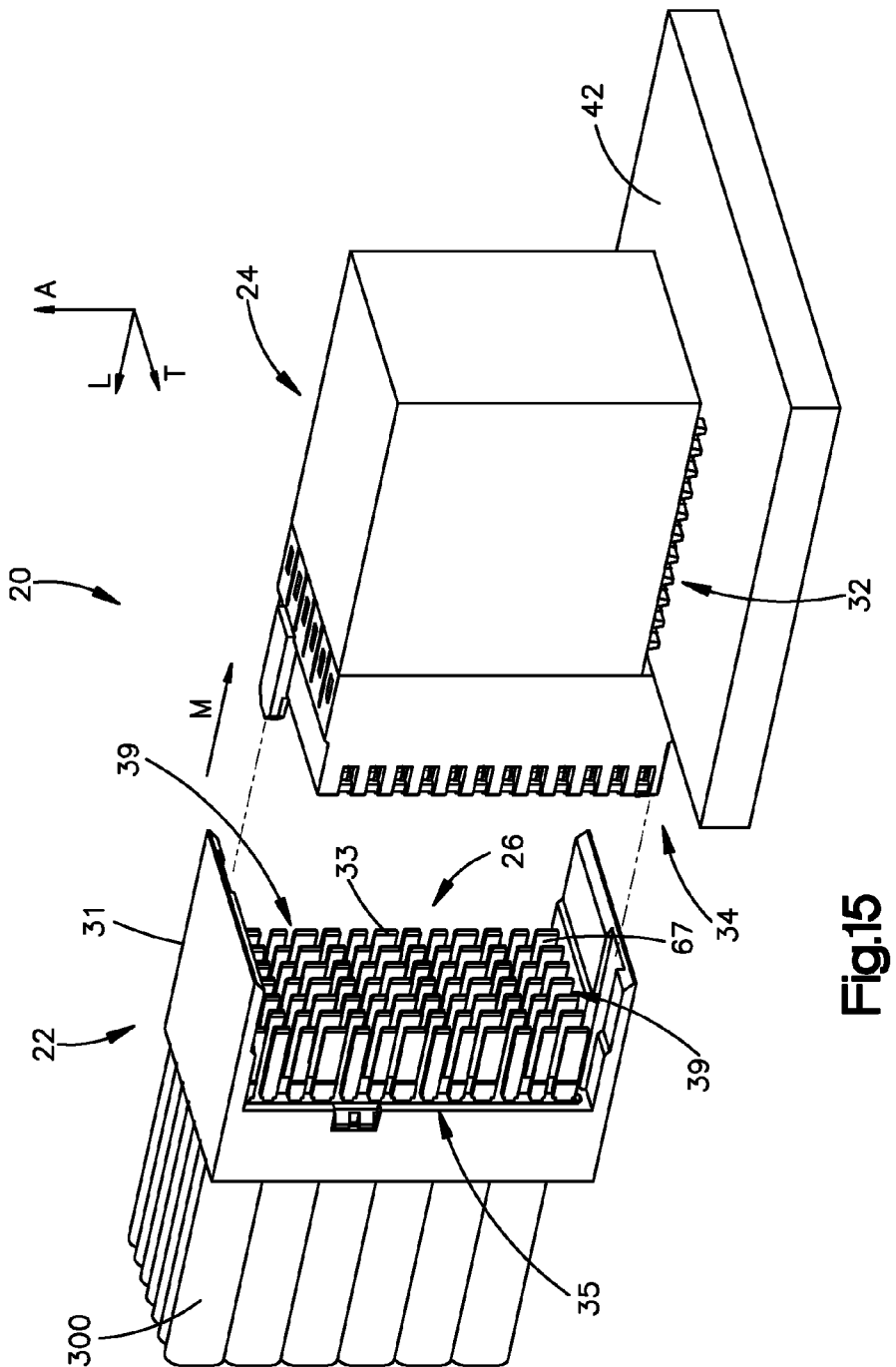
FIG. 15 is a perspective view of an electrical connector assembly including a vertical header connector and a right-angle receptacle connector mounted onto respective substrates, and configured to be mated with each other.

Referring to FIG. 15, an electrical connector assembly 20 includes a first electrical connector 22 and a second electrical connector 24 configured to mate with each other so as to establish an electrical connection between cables 300 and substrate 42. As shown, the second electrical connector 24 can be a right-angle connector defining a mating interface 34 and a mounting interface 32 that is oriented substantially perpendicular to the mating interface 34.

The first electrical connector 22 includes a dielectric, or electrically insulative, connector housing 31 that carries a plurality leadframe assemblies 35 and a corresponding plurality of electrical contacts 33. For example, leadframe assemblies 35 may include one or more of: 1) leadframe assemblies 500a, 500b, or 700; 2) organizers 400 or 600; or 3) substrate 200, as described above in connection with FIGS. 1-14. Further electrical contacts may include one or both of electrical contacts 502 and 702.

Referring again to FIG. 15, the electrical signal contacts 33 may define mating ends 67 extending along the mating interface 26. While not shown in FIG. 15, mating ends 67 of electrical signal contacts 33 may include both the mating end 518a, 718a of the ground mating beams 516, 716 and the mating ends 510a, 710a of the signal contacts 506, 706 extending along the mating interface 26. Each of the mating ends 67 can define a respective first broadside and a respective second broadside opposite the first broadside, and edges disposed between the broadsides, so as to define header mating ends. Thus, the first electrical connector 22 can be referred to as a header connector as illustrated. The beam bodies 518 may have a material thickness, or dimension along the edges along the transverse direction T, of about 0.1 mm to 0.5 mm and a contact height, or dimension along the broadsides along the lateral direction A, of about 0.1 mm to 0.9 mm.

The first electrical connector 22 is configured to mate with and unmate from the second electrical connector 24 along a longitudinal direction L. The first electrical connector 22 is configured to mate with the second electrical connector 24 along a longitudinally forward mating direction M, which extends along the longitudinal direction. The leadframe assemblies 39 can be spaced along the transverse direction T, which is substantially perpendicular to the longitudinal direction L, and defines a row direction. One or more of: 1) a plurality of leadframe assemblies, such as one or more of leadframe assemblies 500a, 500b, 700; 2) one or more of organizers 400, 600; or 3) substrate 200, as described above in connection with FIGS. 1-14, can be oriented along a lateral direction A, which is substantially perpendicular to both the longitudinal direction L and the transverse direction T. The mating ends 67 of each leadframe assembly, including both the mating end 518*a*, 718*a* of the ground mating beams 516, 716 and the mating ends 510*a*. 710*a* of the signal contacts 506, 706, are spaced from each other along the lateral direction A, which can define a column direction.

Further, leadframe assemblies can define a repeating pattern of "S" and "G" along the mating interface 26 and the mounting interface 28 as desired, where "S" denotes mating ends or mounting ends of the electrical signal contacts 33 (such as electrical signal contacts 506, 607), and "G" denotes ground mating ends or ground mounting ends of one or both of the ground mating beams (such as 516 or 716). For instance, the leadframe assemblies 39 can define a repeating S-S-G pattern, a repeating S-G-S configuration, or a repeating G-S-S configuration. Furthermore, different ones of the leadframe assemblies 39 can define differing configurations.

In accordance with one embodiment, a method can be provided for electrically connecting a plurality of cables 300 to a leadframe housing (such as, for example, one or more of leadframe assemblies 500 and 700), each of the plurality of cables 300 including a conductor end (such as, for example, signal conductor end 316), the method comprising providing or teaching to a third party the use of the leadframe housing (such as one or more of leadframe housing 504 or 704) having a plurality of cavities (such as, for example, cavities 416, 616, 728) that extend into the housing body (such as housing body 524 or 724), each cavity of the plurality of cavities configured to isolate an individual conductor end of respective one of the plurality of cables. The method may also include teaching the step of disposing an individual conductor end of a respective one of the plurality of cables into a first cavity of a plurality of cavities and teaching the step of at least partially filling the first cavity with an electrically conductive material 432, the electrically conductive material 432 facilitating electrical communication between the conductor end of each of the plurality of cables and the substrate. The method may further include selling the leadframe housing to the third party.

In accordance with one embodiment, a method can be provided for electrically connecting a plurality of cables 300 to a substrate (such as, for example, substrate, substrate 200) where each of the plurality of cables 300 including a first conductor end (such as, for example, signal conductor end 316), the method comprising providing or teaching to a third party the use of an organizer (such as, for example, organizer 400 or 600) having an organizer body that defines a plurality of cavities (such as, for example, cavities 416, 616, 728), each of the plurality of cavities sized to receive an individual conductor end of a respective one of the plurality of cables. The method may further include teaching the step of attaching the organizer to the substrate and teaching the step of disposing the first conductor end of each of the plurality of cables into a respective one of the plurality of cavities. The method may also include teaching the step of at least partially filling each of the plurality of cavities with an electrically conductive material 432, the electrically conductive material 432 facilitates electrical communication between the first conductor end of each of the plurality of cables and the substrate. Further, the method may include selling the organizer to the third party.

In accordance with another embodiment, a method can be provided for electrically connecting a plurality of cables 300 to a complementary electrical component (such as substrate 200 or leadframe assemblies 500 or 700) where each of the plurality of cables 300 including a conductor end (such as, for example, signal conductor end 316). The method may include providing or teaching to a third party the use of the complementary electrical component, the complementary electrical component carrying a plurality of complementary electrical conductors (such as, for example, conductive elements 203, electrical contacts 502, and electrical contacts 702). The complementary electrical component may also support an organizer (such as, for example, organizer 400, 600, and 730) relative to the complementary electrical component, the organizer having an organizer body that defines a plurality of cavities (such as, for example, cavities 416, 616, 728). The method may also include teaching the step of disposing at least one of the conductor ends of each of the plurality of cables into a respective one of the plurality of cavities. The method may further include teaching the step of at least partially filling the respective one of the plurality of cavities with an electrically conductive material, the electrically conductive material facilitates electrical communication between each of the conductor ends with at least a respective one of the complementary electrical conductors. Additionally, the method may include the step of selling to, the third party, the complementary electrical component, the organizer, or both the complementary electrical component and the organizer.

The foregoing description is provided for the purpose of explanation and is not to be construed as limiting the electrical assembly with organizer. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the electrical assembly with organizer is not intended to be limited to the particulars disclosed herein. For instance, it should be appreciated that structure and methods described in association with one embodiment are equally applicable to all other embodiments described herein unless otherwise indicated. Those skilled in the relevant art, having the benefit of the teachings of this specification, may effect numerous modifications to the electrical assembly with organizer as described herein, and changes may be made without departing from the spirit and scope of the electrical assembly with organizer, for instance as set forth by the appended claims.

For instance, those skilled in the art will appreciated that the above disclosure describes an organizer comprising, for example: a means for attaching to a complementary electrical component; a means for at least partially receiving one or more individual conductor ends from a respective one of a plurality of cables; and a means for electrically isolating each electrically connected individual conductor by, for example, disposing individual conductors into cavities when the organizer is attached to the complementary electrical component.

Those skilled in the art will further appreciated that the above disclosure describes a leadframe assembly comprising, for example: a means for at least partially receiving one or more individual conductor ends from a respective one of a plurality of cables and electrically isolate each electrically connected individual conductor by, for example, disposing individual conductors into individual cavities.

Those skilled in the art will also appreciated that the above disclosure describes a means for attaching an organizer to a substrate; a means for disposing individual conductor ends from a respective one of a plurality of cables into a respective one of a plurality of cavities; and at least partially filling each of the plurality of cavities with an electrically conductive material 432 facilitating electrical communication between the conductor end of each of the plurality of cables and the substrate.

What is claimed:

1. An organizer configured to align a plurality of electrical cable conductors for electrical connection with complementary electrical conductors that are supported by an electrically insulative housing, the organizer comprising:
an electrically insulative organizer body including a plurality of divider walls spaced from each other along a lateral direction, and a pair of inner surfaces that extends between adjacent ones of the plurality of divider walls, such that the organizer body includes a plurality of cavities defined by the adjacent ones of the plurality of divider walls and the inner surfaces, wherein the cavities are configured to receive respective ones of the electrical cable conductors and respective ones of the complementary electrical conductors,
wherein each of the plurality of cavities is configured to receive an electrically conductive material that establishes an electrical path between each of the plurality of electrical cable conductors and the complementary electrical conductors in the cavity, such that the organizer body electrically isolates each of the cavities from all others of the cavities when the cavities have received the electrically conductive material.

2. The organizer of claim 1, wherein the respective ones of the complementary electrical conductors are supported between the divider walls.

3. The organizer of claim 2, wherein the electrically conductive material bonds to both the received electrical cable conductor and the received complementary electrical conductor.

4. The organizer of claim 3, wherein the electrically conductive material is an epoxy.

5. The organizer of claim 2, wherein the respective ones of the complementary electrical conductors are supported at a location at least partially aligned with each of the divider walls, such that a straight line intersecting each of the opposed walls passes through the complementary electrical conductors.

6. The organizer of claim 2, wherein the respective ones of the complementary electrical conductors are supported at a location that is not aligned with each of the divider walls, such that no straight line can intersect each of the divider walls and pass through the complementary electrical conductors.

7. The organizer of claim 1, further comprising a plurality of apertures that extend at least partially through the organizer body to respective ones of the plurality of cavities, each of the apertures configured to receive a respective one of the electrical cable conductor such that the received electrical cable conductors extend from the respective apertures into the respective cavities.

8. The organizer of claim 7, wherein the apertures extend from a surface of the organizer body to the respective cavity along a first direction, and the cavities define an opening that is configured to receive the electrically conductive material along a second direction that is substantially perpendicular to the first direction.

9. The organizer of claim 1, wherein the cavity is further at least partially defined by the electrically insulative housing.

10. The organizer of claim 9, wherein the organizer further comprises at least one retention member supported by the organizer body, the at least one retention member configured to retain the organizer in an attached position relative to the electrically insulative housing.

11. The organizer of claim 1, wherein the organizer body is monolithic with the electrically insulative housing.

12. An organizer configured to align a plurality of electrical cable conductors for electrical connection with respective complementary electrical conductors that are supported by an electrically insulative housing, the organizer comprising:
an electrically insulative organizer body including a plurality of divider walls spaced from each other along a first direction, and a pair of inner surfaces that extends between adjacent ones of the plurality of divider walls, such that the organizer body includes a plurality of cavities defined by the adjacent ones of the plurality of divider walls and the inner surfaces, wherein each of the plurality of cavities is configured to at least partially receive both 1) a single conductor end of one of the plurality of cable conductors, and 2) a single one of the complementary electrical conductors when the organizer body is supported relative to the electrically insulative housing;
wherein both the organizer body and the electrically insulative housing at least partially electrically isolate each of the cavities from all other ones of the cavities when the organizer body is supported relative to the electrically insulative housing, such that a first individual conductor end of a respective one of the plurality of cables disposed in a first cavity of the plurality of cavities is electrically isolated from a second individual conductor end of a respective one of the plurality of cables disposed in a second cavity of the plurality of cavities.

13. The organizer of claim 12, wherein the first and second conductor ends are placed in electrical communication with the complementary electrical component by at least partially filling the first and second cavities, respectively, with an electrically conductive material.

14. The organizer of claim 12, wherein the organizer body includes a cavity portion that at least partially defines the plurality of cavities, wherein the cavity portion is elongate along the first direction and the cavities of the plurality of cavities are disposed adjacent to one another along the first direction.

15. The organizer of claim 14, wherein the organizer body further includes a wall and the cavity portion extends outward with respect to the wall along a second direction that extends substantially perpendicular to the first direction, and wherein the wall defines an upper end and an opposed lower end that is spaced from the upper end along a third direction that extends substantially perpendicular to both the first and second directions, respectively.

16. The organizer of claim 15, wherein the at least one retention member comprises a tab that is monolithic with the organizer body and extends outward from the wall along the second direction, wherein the at least one retention member is configured to retain the organizer in an attached position relative to the complementary electrical component.

17. The organizer of claim 16, wherein the complementary electrical component comprises a printed circuit board that defines an upper surface and an opposed lower surface, the organizer body defining an abutment surface configured to abut the upper surface of the printed circuit board when the organizer is attached to the printed circuit board, and the tab is configured to engage the printed circuit board.

18. The organizer of claim 17, wherein the tab engages the lower surface of the printed circuit board when the organizer is attached to the printed circuit board.

19. The organizer of claim 15, wherein the complementary electrical component comprises a leadframe assembly that includes a leadframe housing and a plurality of electrical contacts supported by the leadframe housing, the organizer body defines an abutment surface configured to abut an upper surface of the leadframe housing when the organizer is attached to the leadframe assembly, and the at least one retention member is configured to engage the leadframe assembly.

20. The organizer of claim 15, wherein the wall defines a plurality of apertures that extend through the wall substantially along the second direction, each aperture of the plurality of apertures configured to receive the single conductor end of a respective one of the plurality of cables.

21. An electrical assembly comprising:
a leadframe housing configured to be supported by an electrical connector, the leadframe housing having a housing body that defines a mounting end and an opposed mating end that is spaced from the mounting end along a mating direction, the housing body defines a plurality of cavities that extend into the housing body, each cavity of the plurality of cavities configured to physically isolate an individual conductor end of respective one of a plurality of cables from all other conductor ends of the plurality of cables that are disposed in others of the plurality of cavities; and
a plurality of electrical contacts supported by the leadframe housing, each of the plurality of electrical contacts has a contact body that defines a mounting end and an opposed mating end.

22. The electrical assembly of claim 21, further comprising a plurality of cables configured to be placed in electrical communication with the plurality of electrical contacts, each cable including at least one conductor end, wherein individual conductor ends of the plurality of cables are disposed in a corresponding one of the plurality of cavities.

23. The electrical assembly of claim 22, wherein the cavities of the plurality of cavities are arranged in respective pairs of cavities, each pair of cavities including a first cavity configured to receive a first individual conductor end of a respective cable of the plurality of cables and a second cavity configured to receive a second individual conductor end of the respective cable of the plurality of cables, the pairs of cavities spaced relative to one another along the second direction.

24. The electrical assembly of claim 21, wherein the cavities of the plurality of cavities are arranged adjacent to one another along a second direction that extends substantially perpendicular to the mating direction.

25. The electrical assembly of claim 23, wherein the plurality of cavities is located closer to the mounting end than to the mating end.

26. The electrical assembly of claim 21, wherein the plurality of electrical contacts comprise a plurality of signal contacts, each signal contact of the plurality of signal contacts supported by the connector housing such that a portion of the signal contact is disposed in a corresponding cavity of the plurality of cavities.

27. The electrical assembly of claim 26, wherein each of the plurality of cavities is at least partially filled with a conductive epoxy, the conductive epoxy facilitates electrical communication between the respective mounting end and the individual conductor end disposed in each cavity of the plurality of cavities.

28. The electrical assembly of claim 27, wherein the plurality of electrical contacts further comprises at least one ground contact.

29. The electrical assembly of claim 28, wherein the at least one ground contact comprises a ground plate that includes a plurality of ground mating beams.

30. A method of electrically connecting a plurality of cables to a complementary electrical component that carries a plurality of complementary electrical conductors, each cable including a conductor end, the method comprising:
supporting an organizer relative to the complementary electrical component, the organizer having an organizer body that includes a plurality of divider walls spaced from each other along a lateral direction, and a pair of inner surfaces that extends between adjacent ones of the plurality of divider walls, such that the organizer body includes a plurality of cavities defined by the adjacent ones of the plurality of divider walls and the inner surfaces;
disposing at least one of the conductor ends of each of the plurality of cables into a respective one of the plurality of cavities; and
at least partially filling the respective one of the plurality of cavities with an electrically conductive material, the electrically conductive material facilitates electrical communication between each of the conductor ends with at least a respective one of the complementary electrical conductors.

31. The method of claim 30, wherein the supporting step further comprises the step of attaching the organizer to the complementary electrical component.

32. The method of claim 30, wherein when the organizer is attached to the substrate, and the plurality of cavities are isolated from each other by cooperation of the organizer body and the complementary electrical component.

33. A method of electrically connecting a plurality of cables to a complementary electrical component, each of the plurality of cables including a conductor end, the method comprising:
providing or teaching to a third party the use of the complementary electrical component, the complementary electrical component carrying a plurality of complementary electrical conductors, complementary electrical component supporting an organizer relative to the complementary electrical component, the organizer having an organizer body that includes a plurality of divider walls spaced from each other along a lateral direction, and a pair of inner surfaces that extends between adjacent ones of the plurality of divider walls, such that the organizer body includes a plurality of cavities defined by the adjacent ones of the plurality of divider walls and the inner surfaces;
teaching the step of disposing at least one of the conductor ends of each of the plurality of cables into a respective one of the plurality of cavities;
teaching the step of at least partially filling the respective one of the plurality of cavities with an electrically conductive material, the electrically conductive material facilitates electrical communication between each of the conductor ends with at least a respective one of the complementary electrical conductors; and
selling to, the third party, at least one of the complementary electrical component or the organizer.

* * * * *